(12) United States Patent
Nakamura et al.

(10) Patent No.: US 11,345,315 B2
(45) Date of Patent: May 31, 2022

(54) WIPER MOTOR AND METHOD OF MANUFACTURING THE SAME

(71) Applicant: Mitsuba Corporation, Gunma (JP)

(72) Inventors: Osamu Nakamura, Gunma (JP); Hiroyuki Yoshida, Gunma (JP)

(73) Assignee: Mitsuba Corporation, Kiryu (JP)

( * ) Notice: Subject to any disclaimer, the term of this patent is extended or adjusted under 35 U.S.C. 154(b) by 321 days.

(21) Appl. No.: 16/642,461

(22) PCT Filed: Jul. 31, 2018

(86) PCT No.: PCT/JP2018/028572
§ 371 (c)(1),
(2) Date: Feb. 27, 2020

(87) PCT Pub. No.: WO2019/049554
PCT Pub. Date: Mar. 14, 2019

(65) Prior Publication Data
US 2020/0254975 A1    Aug. 13, 2020

(30) Foreign Application Priority Data

Sep. 5, 2017    (JP) .............................. JP2017-170028

(51) Int. Cl.
*H02P 1/04*    (2006.01)
*B60S 1/08*    (2006.01)
(Continued)

(52) U.S. Cl.
CPC .  *B60S 1/08* (2013.01); *B60S 1/18* (2013.01); *F16H 1/16* (2013.01); *F16H 21/40* (2013.01);
(Continued)

(58) Field of Classification Search
CPC ... H02P 29/40; B60S 1/08; B60S 1/18; H02K 11/21; H02K 7/16; H01H 11/04; H01R 39/00; F16H 1/16; F16H 21/40
See application file for complete search history.

(56) References Cited

FOREIGN PATENT DOCUMENTS

| JP | H01190562 A | 7/1989 |
|---|---|---|
| JP | H11214116 A | 8/1999 |

(Continued)

OTHER PUBLICATIONS

International Search Report for PCT Application No. PCT/JP2018/028572 dated Nov. 13, 2018.

*Primary Examiner* — Karen Masih
(74) *Attorney, Agent, or Firm* — McCormick, Paulding & Huber PLLC

(57) ABSTRACT

A replay plate 44 is set to have a vertically and horizontally symmetrical shape when a worm wheel 33 is viewed from its axial direction; the worm wheel 33 is provided with an accommodating concave portion 33g in which the relay plate 44 is housed so as to be recessed in the axial direction; and a part of a non-slidably contacting surface in a slidably contacting surface 44a of the relay plate 44, i.e., a non-slidably contacting surface S is covered with first and second fixing parts 35a, 35b that are provided around the accommodating concave portion 33g and protrude in a direction intersecting with an axial direction of the worm wheel 33, the non-slidably contacting surface being a surface with which the contact plate is not slidably contacted.

13 Claims, 28 Drawing Sheets

(51) Int. Cl.
    *H02K 11/21*     (2016.01)
    *B60S 1/18*     (2006.01)
    *F16H 1/16*     (2006.01)
    *F16H 21/40*     (2006.01)
    *H01H 11/04*     (2006.01)
    *H01R 39/00*     (2006.01)
    *H02K 5/22*     (2006.01)
    *H02K 7/116*     (2006.01)

(52) U.S. Cl.
    CPC ............ *H01H 11/04* (2013.01); *H01R 39/00* (2013.01); *H02K 5/22* (2013.01); *H02K 7/116* (2013.01); *H02K 11/21* (2016.01)

(56) References Cited

FOREIGN PATENT DOCUMENTS

| | | | |
|---|---|---|---|
| JP | 2006306315 A | | 11/2006 |
| JP | 2008247171 A | * | 10/2008 |
| JP | 2009043610 A | | 2/2009 |
| JP | 2009064675 A | | 3/2009 |
| JP | 2009213250 A | | 9/2009 |
| JP | 2010213464 A | | 9/2010 |
| JP | 2012137114 A | | 7/2012 |
| JP | 2021040426 A | * | 3/2021 |

* cited by examiner

FIG. 3
(a)
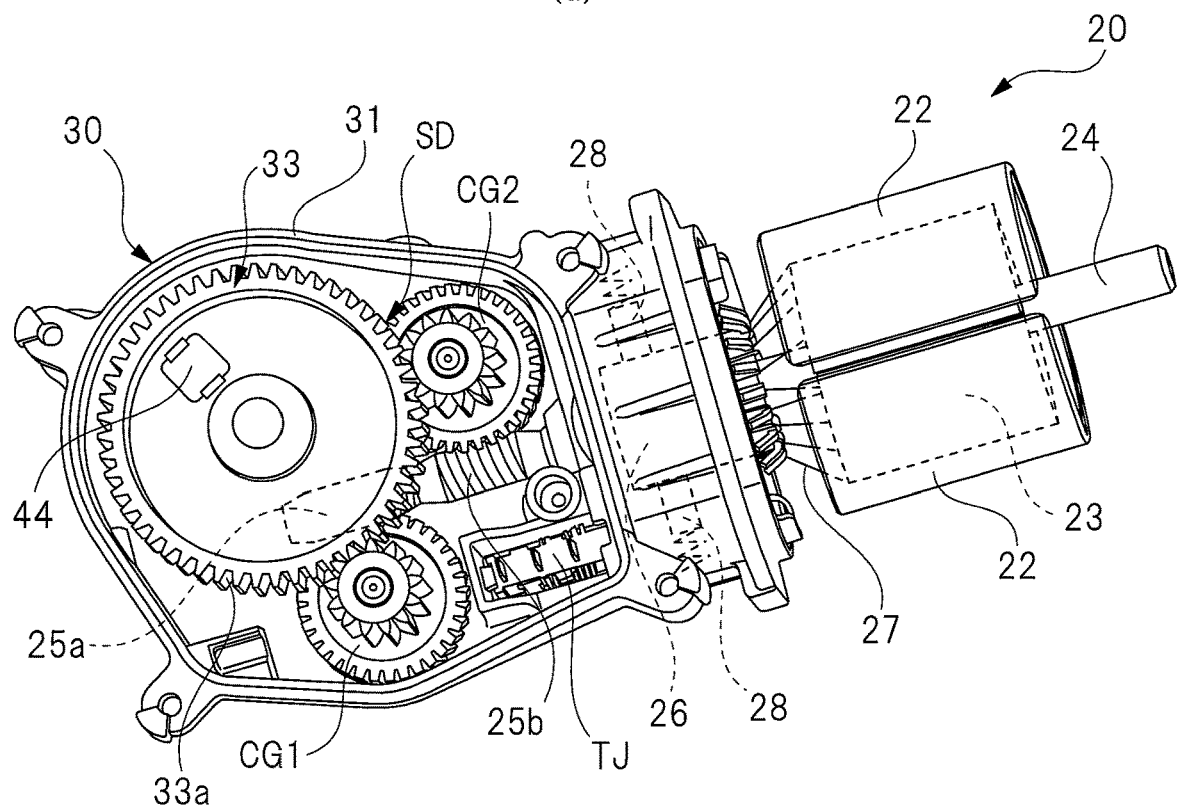
(b)
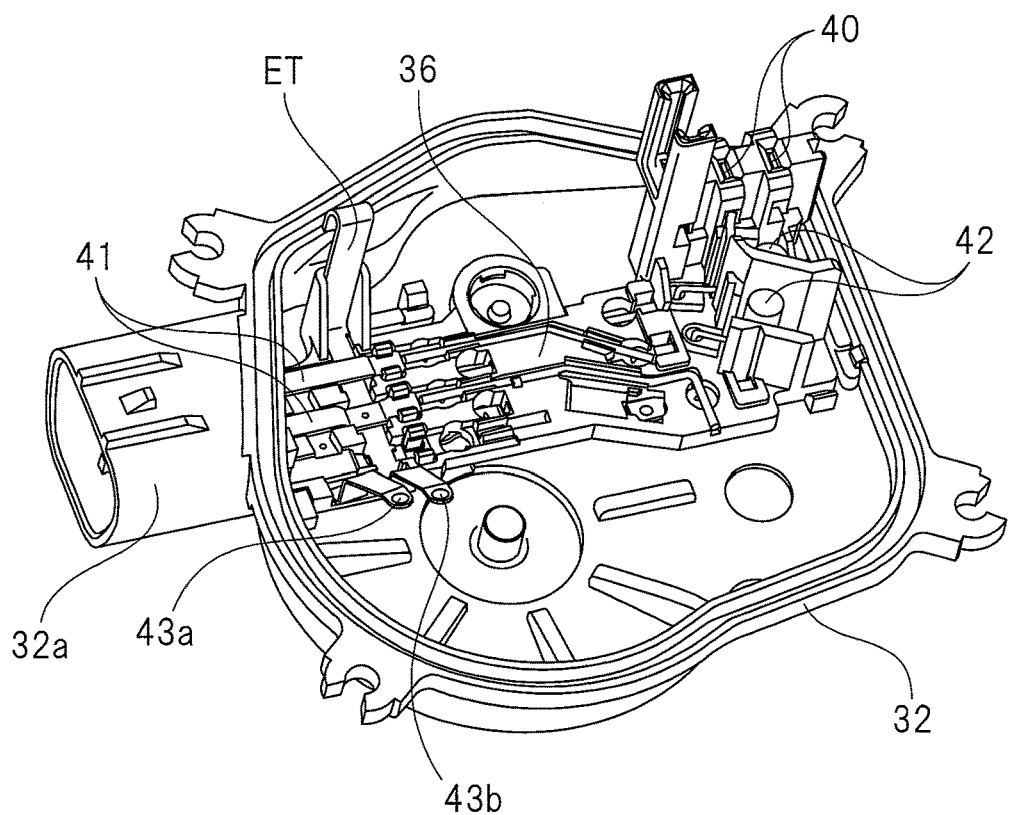

FIG. 7
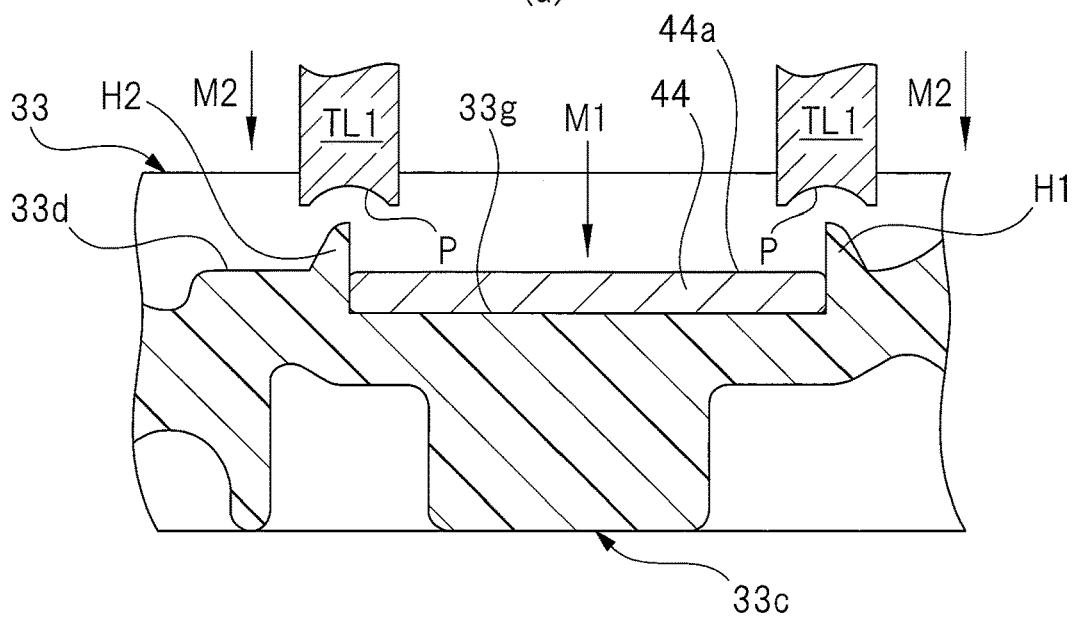
(a)
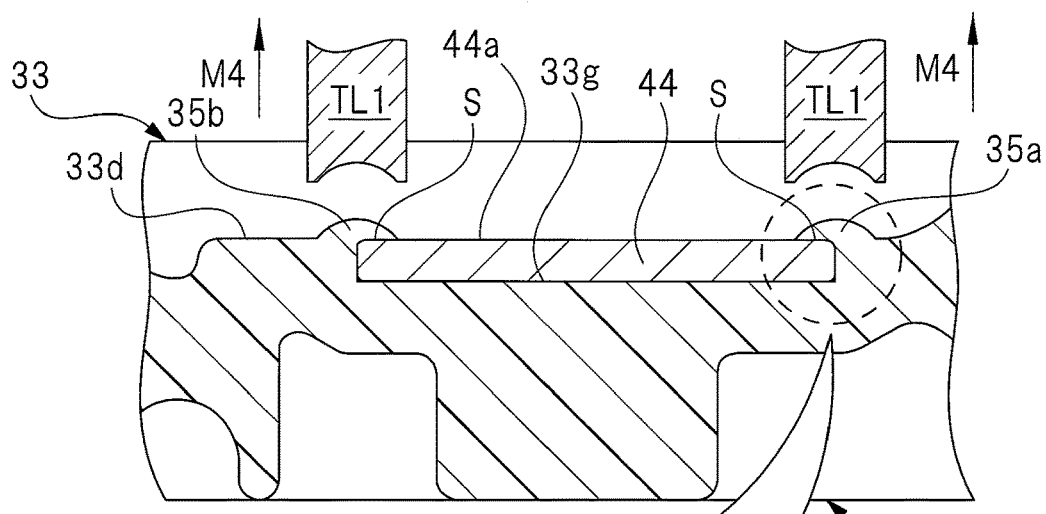
(b)
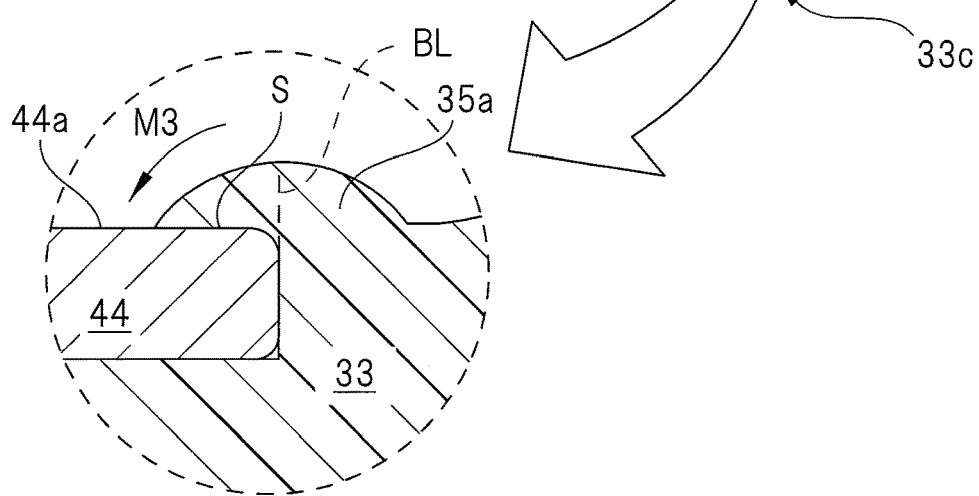

FIG. 8
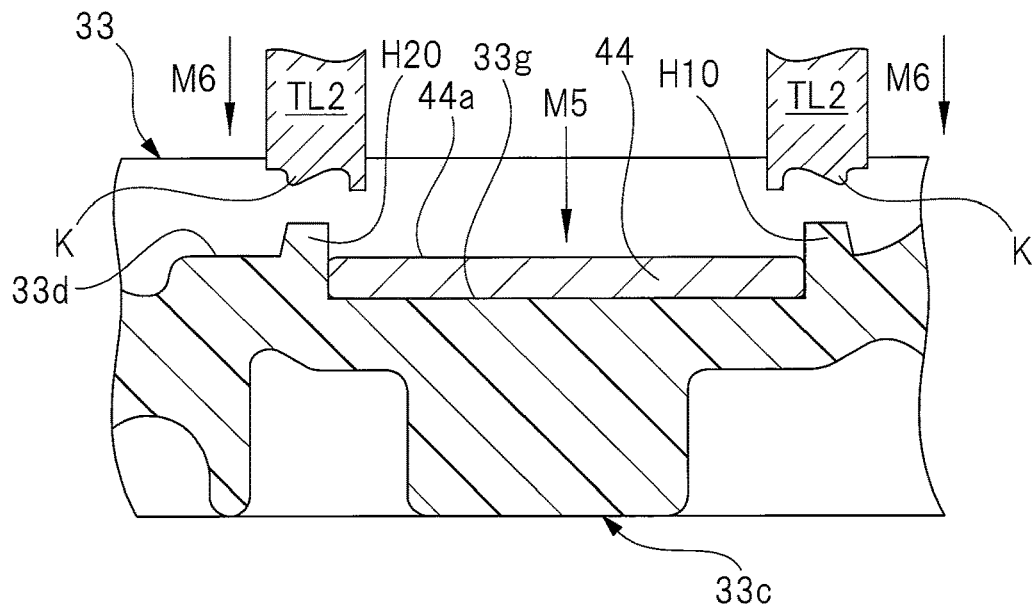
(a)
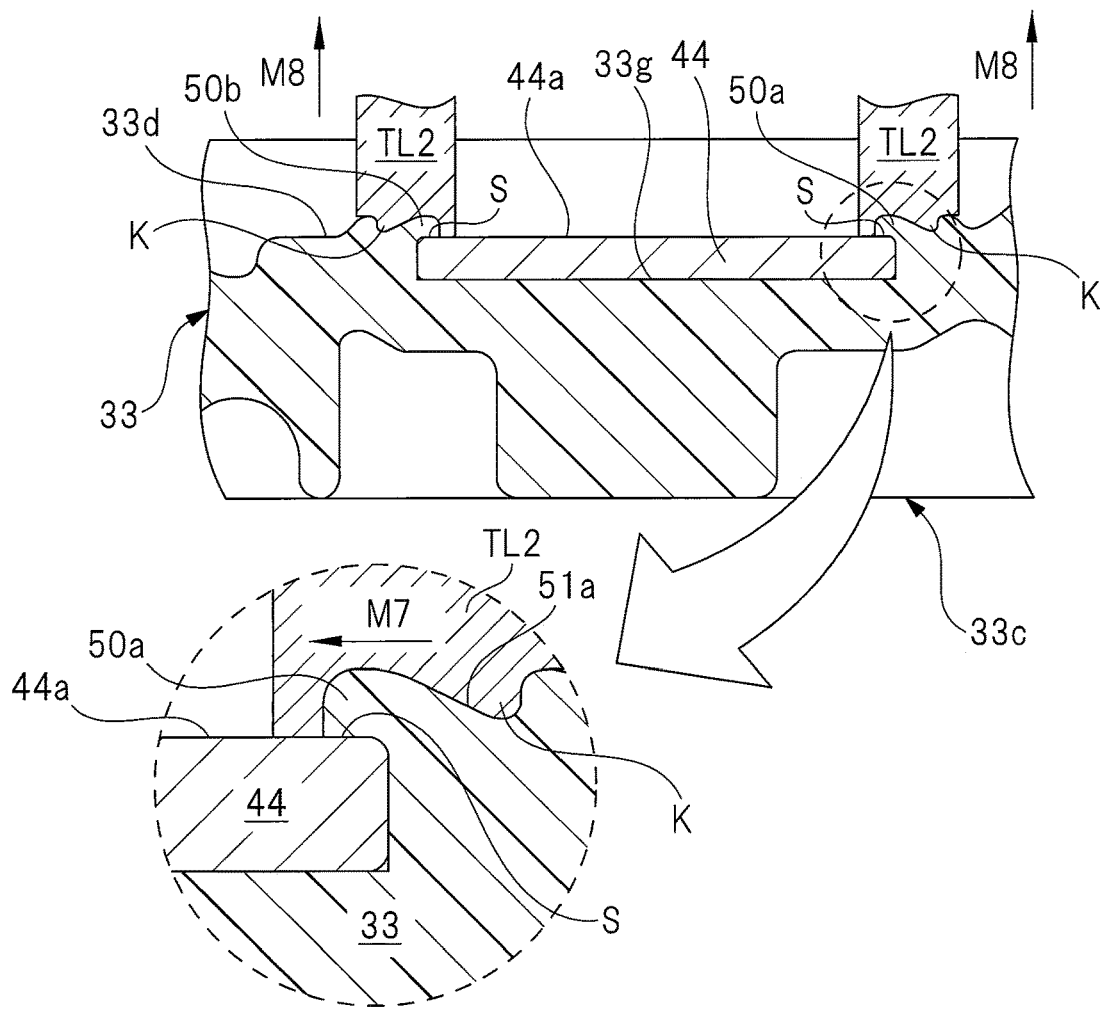
(b)

FIG. 11
(a)
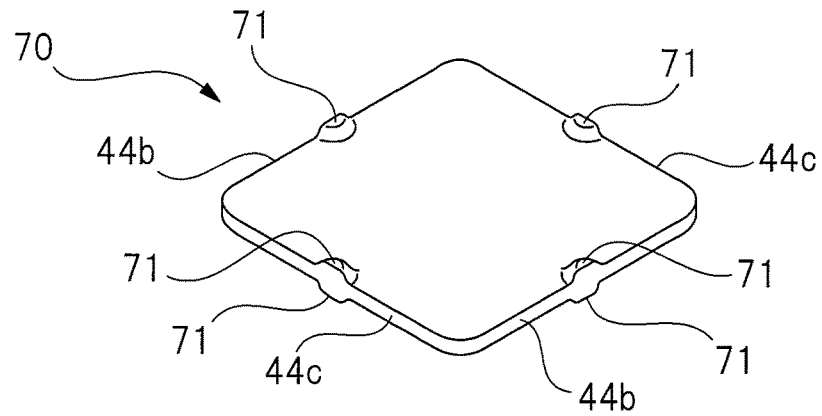
(b)
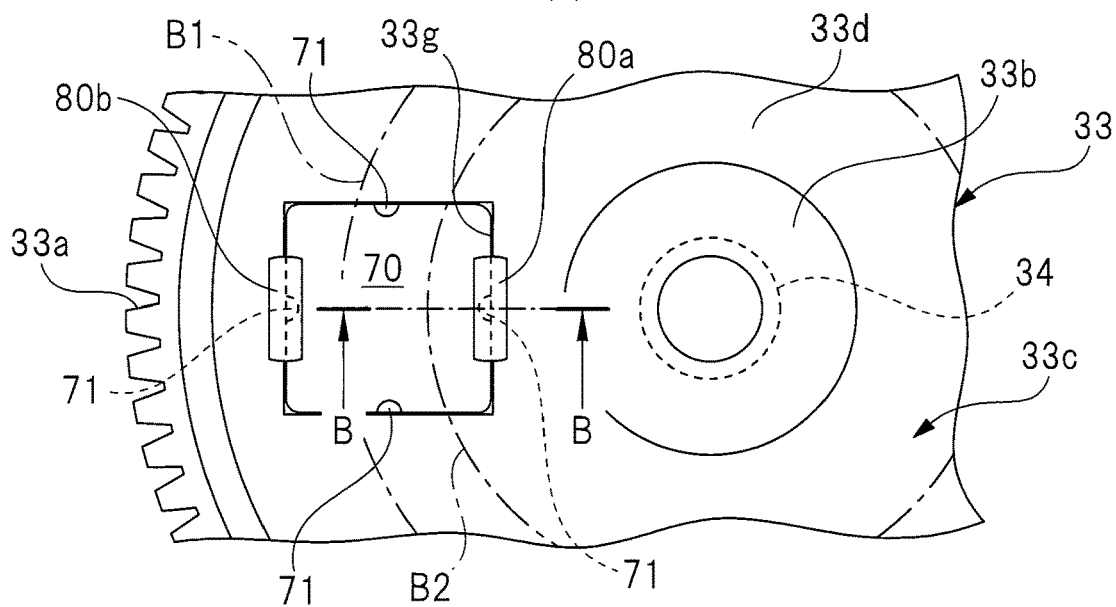
(c)
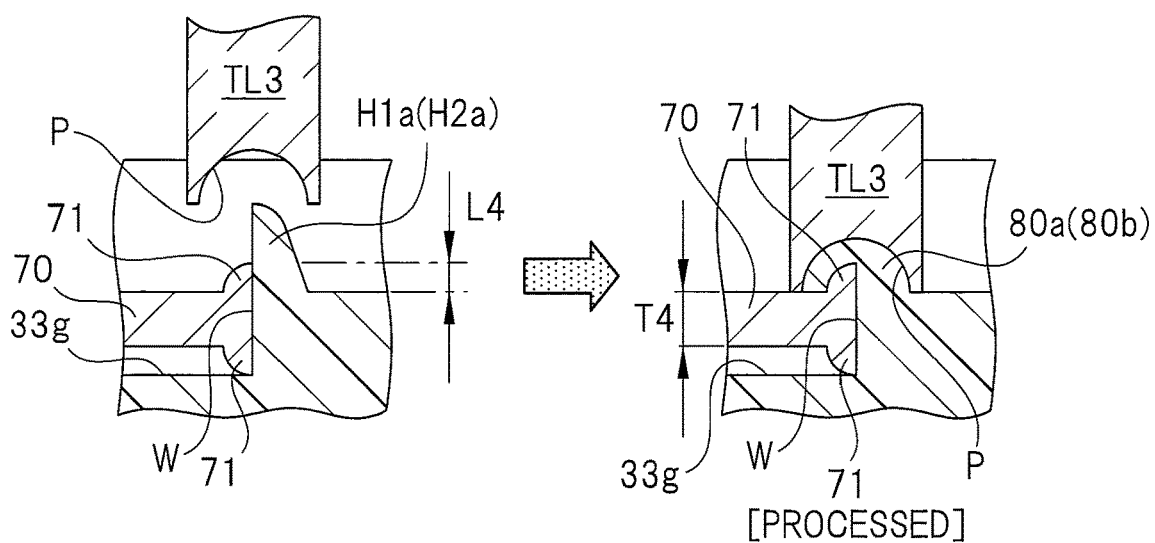
[PROCESSED]

FIG. 15
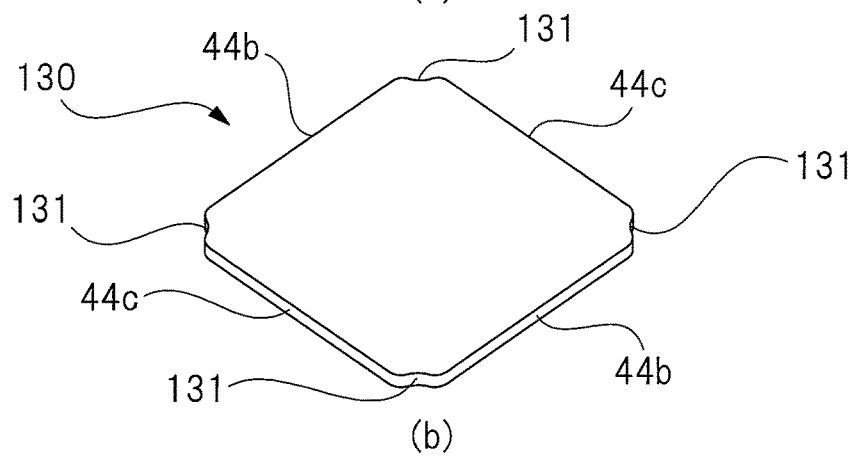
(a)
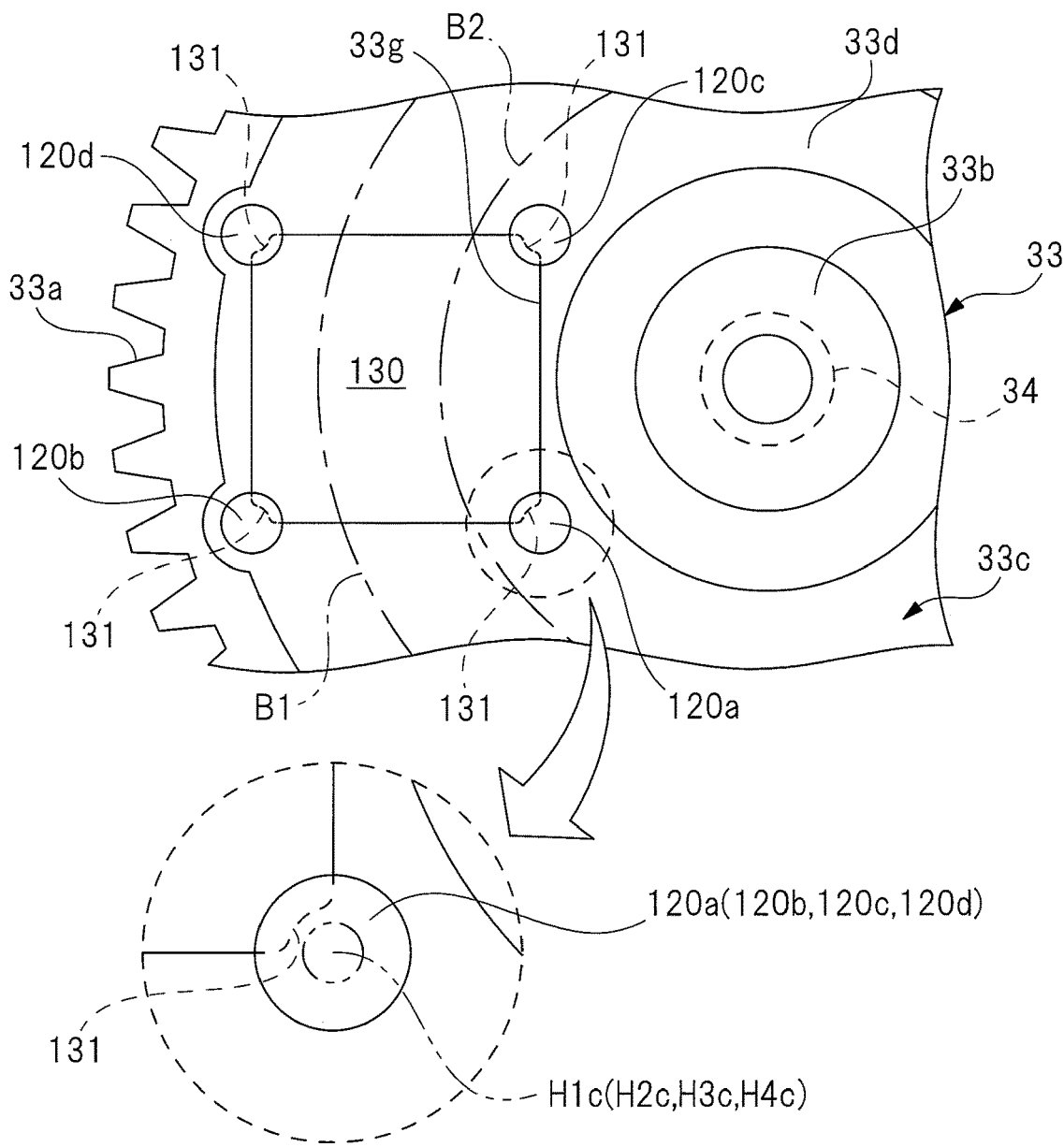
(b)

FIG. 16
(a)
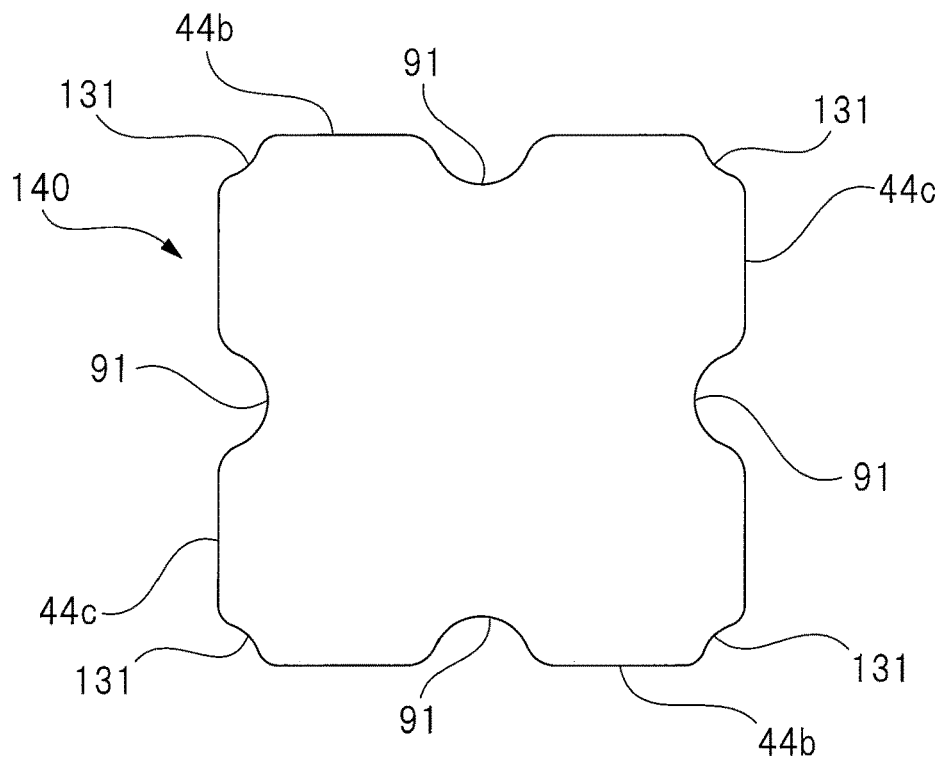
(b)
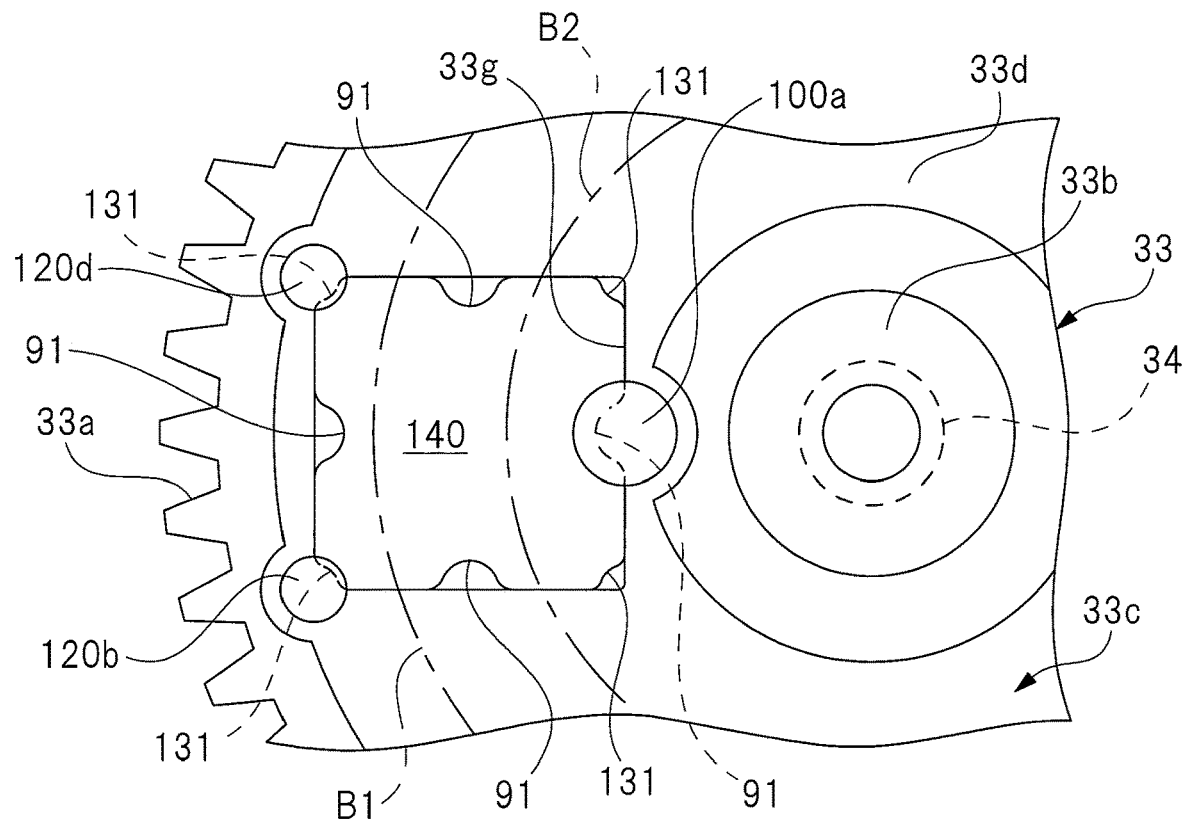

FIG. 23
(a)
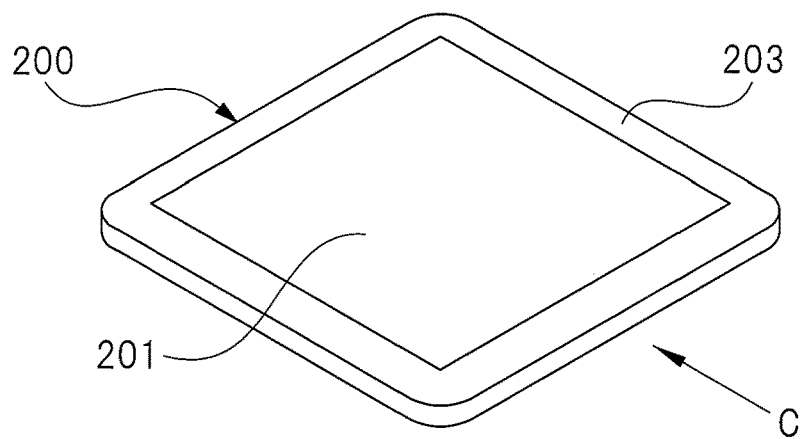
(b)
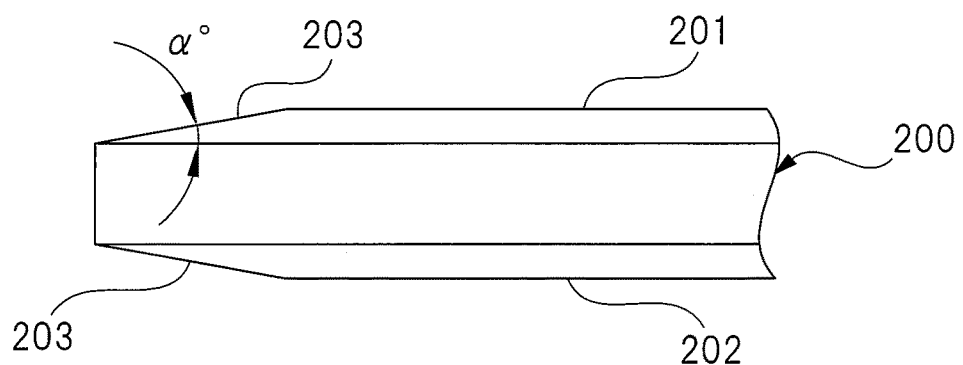
(c)
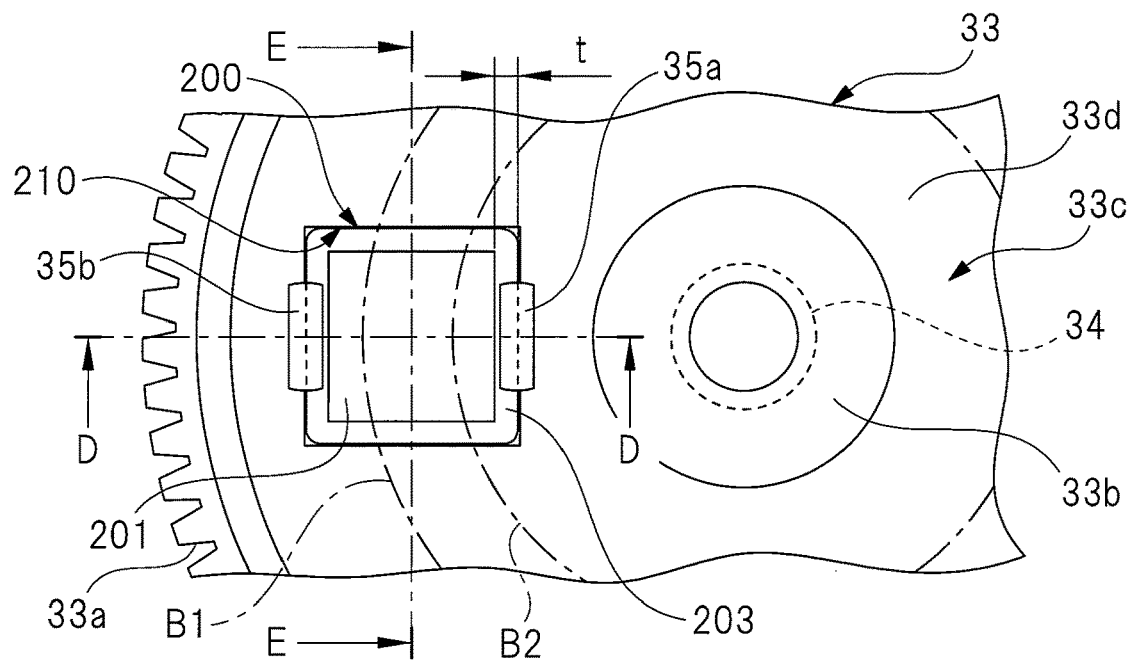

FIG. 27
(a)
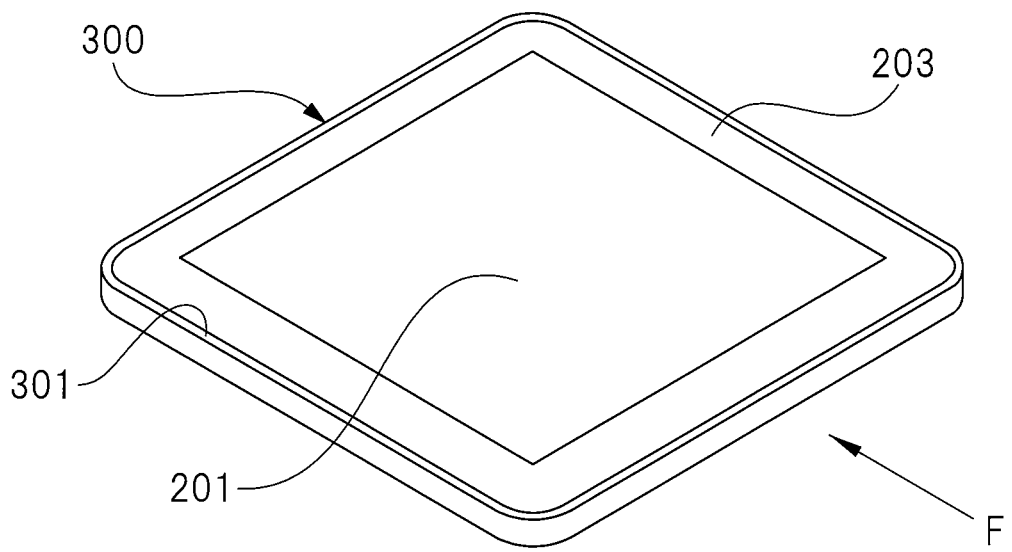
(b)
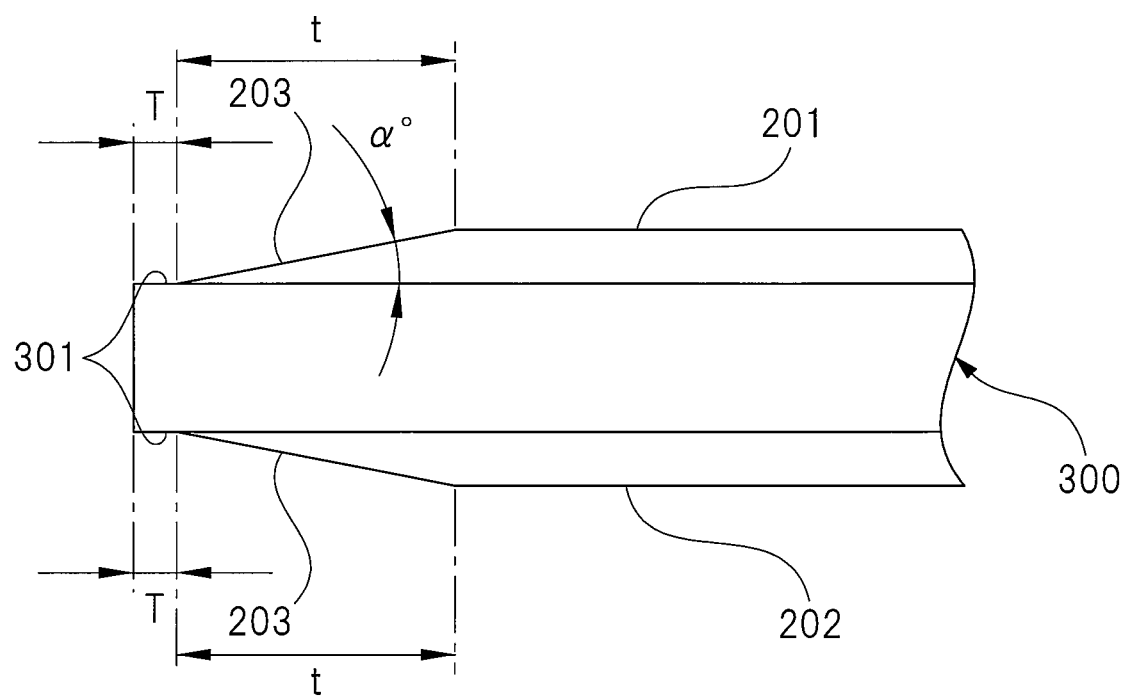

WIPER MOTOR AND METHOD OF MANUFACTURING THE SAME

CROSS-REFERENCE TO RELATED APPLICATIONS

This application is a National Stage application of International Patent Application No. PCT/JP2018/028572, filed on Jul. 31, 2018, which claims priority to Japanese Patent Application No. 2017-170028 filed on Sep. 5, 2017, each of which is hereby incorporated by reference in its entirety.

TECHNICAL FIELD

The present invention relates to a wiper motor and a method of manufacturing the same, the wiper motor including: a relay plate; and at least two contact plates slidably contacting with the wiper motor, wherein rotation of an armature shaft is stopped when the contact plates are short-circuited by contacting with the relay plate.

BACKGROUND

Conventionally, vehicles such as automobiles are each equipped with a wiper device, the wiper device swinging a wiper member(s) that wipes a wiping surface. Adopted as a drive source of the wiper device is a wiper motor having a speed reduction mechanism that is small in size but capable of exerting a large output. The wiper motor has an automatic stopping function of automatically stopping the wiper member at its storage position regardless of timing of a turning-off operation of a wiper switch by a user. Providing such an automatic stopping function prevents the wiper member from stopping in front of the wiping surface so that a satisfactory field of vision is ensured. A technique having such an automatic stopping function include, for example, techniques disclosed in Japanese Patent Application Laid-open No. 2009-064675 and Japanese Patent Application Laid-open No. 2006-306315.

In a wiper motor disclosed in Japanese Patent Application Laid-open No. 2009-064675, a relay plate used for an automatic stopping function is formed in a substantially annular shape by punching a conductive steel plate and folding its part. The relay plate is integrally provided with a locking claw. The locking claw is hooked through (on) a hole of a worm wheel (rotating body) and folded to fix the relay plate to the worm wheel.

Such a relay plate made of a steel plate can be easily attached to the worm wheel by using the foldable (soft) locking claw. Meanwhile, lubricating oil (grease) is applied to the relay plate in order to smooth slide of a contact plate. In some cases, the lubricating oil becomes an oil film that functions as an insulating material between the relay plate and the contact plate, thereby leading to occurrence of poor conductivity properties.

Therefore, a method as shown in a wiper motor disclosed in Japanese Patent Application Laid-open No. 2006-306315 is conceivable as follows: a relay plate used for an automatic stopping function is formed of sintered metal (porous material) having a myriad of holes so that lubricating oil is impregnated into the myriad of holes. Consequently, every time a contact plate slidably contacts on the relay plate, the lubricating oil in the holes is pushed out or enters some vacant holes, thereby causing sliding and conductivity properties between the contact plate and the relay plate to be kept good.

SUMMARY

However, in the wiper motor disclosed in Patent Document 2 described above, since the relay plate is formed of the sintered metal having the myriad of holes, it is less flexible and more brittle than the relay plate made of a steel plate. Therefore, its folding processing etc. cannot be performed, so that a fixing structure to a rotating body by using the locking claw as disclosed in Patent Document 1 cannot be adopted.

Further, in the wiper motor disclosed in Patent Document 2, the annularly formed relay plate is fixed to an annularly formed concave portion of the rotating body by light press-fitting etc. Consequently, such a light press-fitting processing needs to carefully fix the relay plate into the concave portion, which may bring a problem of easily chattering (rattling) therebetween during an operation of the wiper motor subsequently to the fixture.

An object of the present invention is to provide a wiper motor and a method of manufacturing the same, the wiper motor being capable of securely fixing a relay plate to a rotating body without rattling therebetween while sliding and conductivity properties between the relay plate and a contact plate in the wiper motor are kept (maintained) good.

A wiper motor according to the present comprises: a motor having an armature shaft; a rotating body rotated by the armature shaft; a relay plate provided on the rotating body; at least two contact plates slidably contacting with a slidably contacting surface of the relay plate; and rotation of the armature shaft being stopped when the contact plates are short-circuited by contacting with the slidably contacting surface, in which the relay plate has a vertically and horizontally symmetrical shape when the rotating body is viewed from its axial direction, the rotating body is provided with an accommodating concave portion that houses the relay plate so as to be recessed in its axial direction, and a part of a non-slidably contacting surface in the slidably contacting surface is covered with a plurality of fixing parts that are provided around the accommodating concave portion and that protrude in a direction intersecting with an axial direction of the rotating body, the non-slidably contacting surface being a surface with which the contact plates are not slidably contacted.

In another embodiment according to the present invention, a pair of fixing parts in the plurality of fixing parts are provided on a virtual line that passes an axial center of the rotating body and extends in a radial direction of the rotating body, one of the pair of fixing parts protrudes radially outside the rotating body, and the other of the pair of fixing parts protrudes radially inside the rotating body.

In another embodiment according to the present invention, the relay plate is formed into a substantially square shape when the rotating body is viewed from the axial direction, and two sides of the relay plate, which oppose each other, are arranged on a virtual line that passes an axial center of the rotating body and extends in a radial direction of the rotating body.

In another embodiment according to the present invention, each of the fixing parts is formed into a substantially rectangular shape when the rotating body is viewed from the axial direction, and the fixing parts extend along each of the two sides, and are longer in length than half a length of each of the sides.

In another embodiment according to the present invention, the relay plate is provided with a protrusion that protrudes in the axial direction of the rotating body, and the protrusion is covered with the fixing parts.

In another embodiment according to the present invention, a plurality of notch portions are provided around the relay plate, and the notch portions are covered with the fixing parts.

In another embodiment according to the present invention, first inclined surfaces are provided on front and back surfaces of the relay plate, the first inclined surfaces being directed toward a circumference of the relay plate and thinned gradually toward the relay plate, at least parts of the first inclined surfaces are covered with the fixing parts, and second inclined surfaces that support the first inclined surfaces are provided in the accommodating concave portion.

In another embodiment according to the present invention, a pair of second inclined surfaces in the second inclined surfaces are arranged so as to oppose each other in a slidably contacting direction of the contact plate.

In another embodiment according to the present invention, the pair of second inclined surfaces are arranged so as to oppose each other in the radial direction of the rotating body.

In the other embodiment according to the present invention, a plurality of convex portions are provided on a bottom surface of the accommodating concave portion so that the relay plate housed in the accommodating concave portion is made parallel to the bottom surface.

In a method of manufacturing a wiper motor according to the present invention, the wiper motor including: a motor having an armature shaft; a rotating body rotated by the armature shaft; a relay plate provided on the rotating body; at least two contact plates slidably contacting with a slidably contacting surface of the relay plate; and rotation of the armature shaft being stopped when the contact plates are short-circuited by contacting with the slidably contacting surface, the method comprises: a relay plate housing step of housing the relay plate in an accommodating concave portion that is provided in the rotating body; and a relay plate fixing step of heating and thermally deforming a heat receiving portion and covering a part of a non-slidably contacting surface in the slidably contacting surface with the thermally deformed heat receiving portion, the heat receiving portion being provided around the accommodating concave portion and protruding in an axial direction of the rotating body, the non-slidably contacting surface being a surface with which the contact plates are not slidably contacted.

In another embodiment according to the present invention, the heat receiving portion is provided in a radial direction of the rotating body and at a position apart from a wall that forms the accommodating concave portion.

In the other embodiment according to the present invention, the relay plate is provided with a protrusion that protrudes in an axial direction of the rotating body, and the protrusion is covered with the thermally deformed heat receiving portion in the relay plate fixing step.

According to the present invention, the relay plate has a vertically and horizontally symmetrical shape when the rotating body is viewed from the axial direction; the rotating body is provided with an accommodating concave portion in which the relay plate is housed so as to be recessed (concaved) in the axial direction; and a part of a non-slidably contacting surface in a slidably contacting surface of the relay plate is covered with the plurality of fixing parts that are provided around the accommodating concave portion and protrude in a direction intersecting with the axial direction of the rotating body, the non-slidably contacting surface being a surface with which the relay plate is not slidably contacted.

This makes it possible to form the relay plate into a simple shape having no directivity, so that the relay plate can be easily molded by a porous material such as sintered metal. Molding the relay plate by the sintered metal etc. makes it possible to impregnate lubricating oil, and ensure sufficient sliding and conductivity properties. Additionally, the relay plate can be easily fixed to the rotating body without the rattling of the relay plater and without depending on a locking claw. Further, forming the fixing parts by thermally deforming the part of the rotating body makes another component for the fixing unnecessary and makes it possible to reduce the number of components of the wiper motor. Additionally, since the relay plate can be formed into a simple shape by using sintered metal etc., a density balance of powder to be a raw material can be made uniform.

BRIEF DESCRIPTIONS OF THE DRAWINGS

Figure 2:
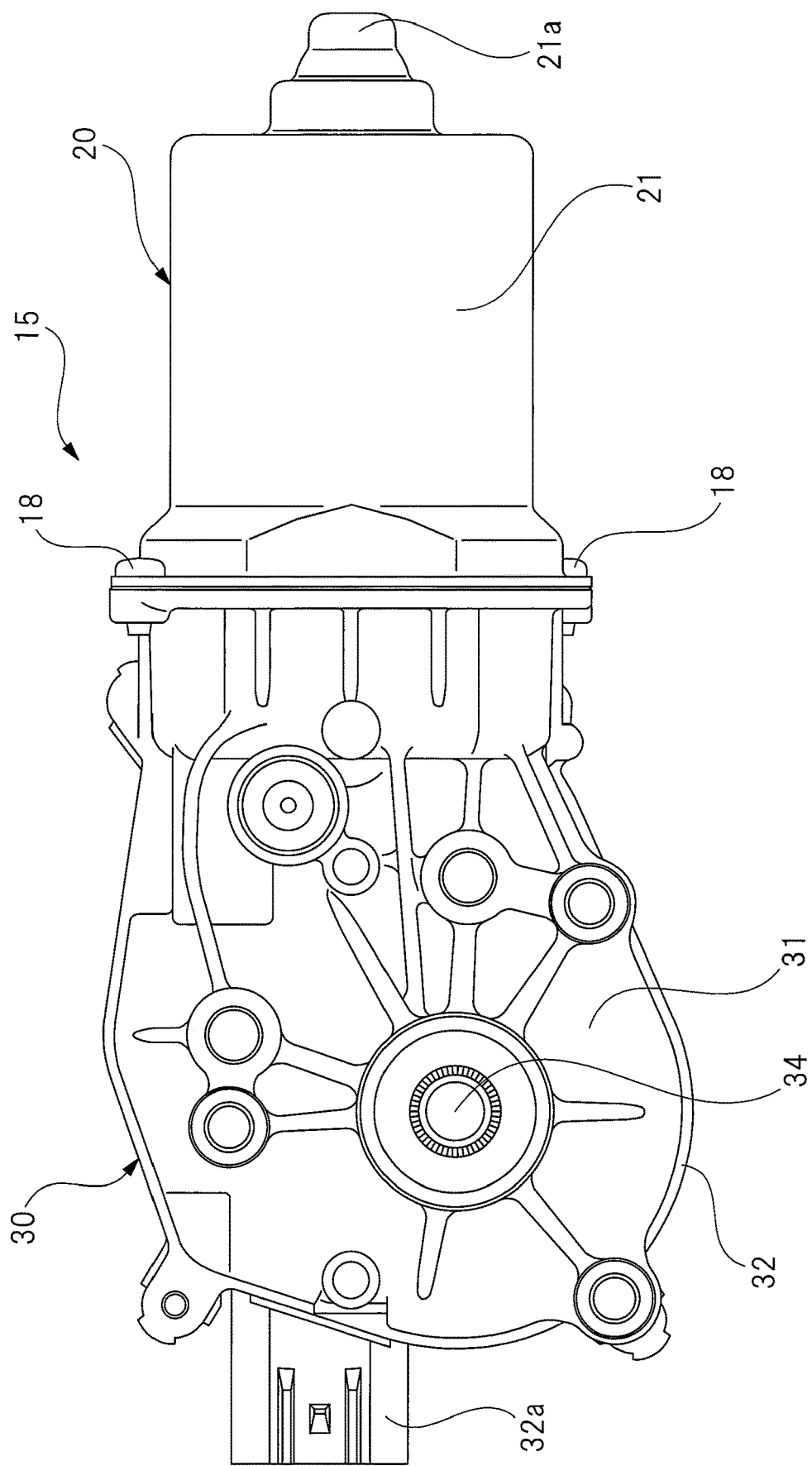
FIG. 2 is a top view showing the wiper motor of FIG. 1.
Figure 4:
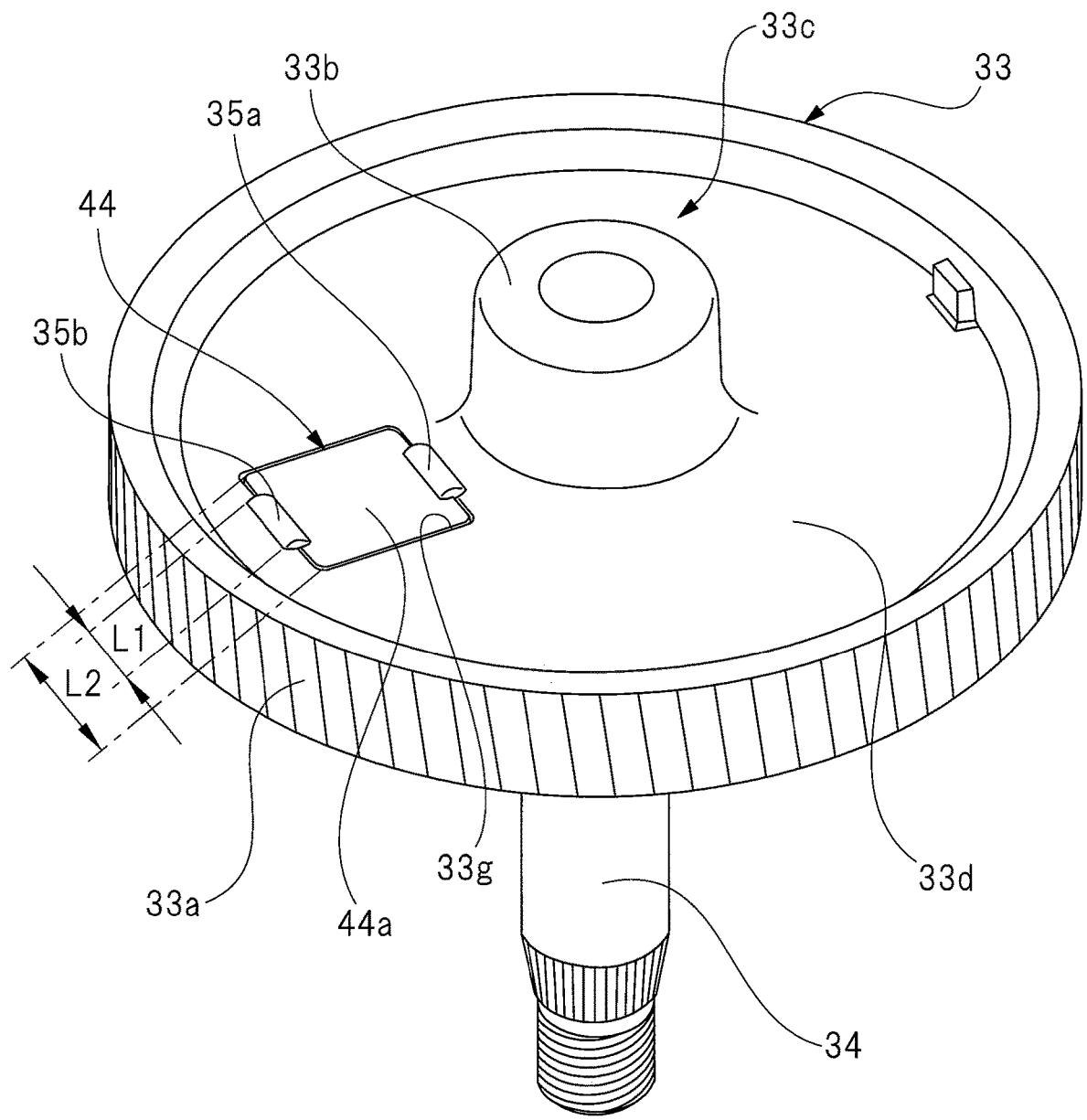
Figure 5:
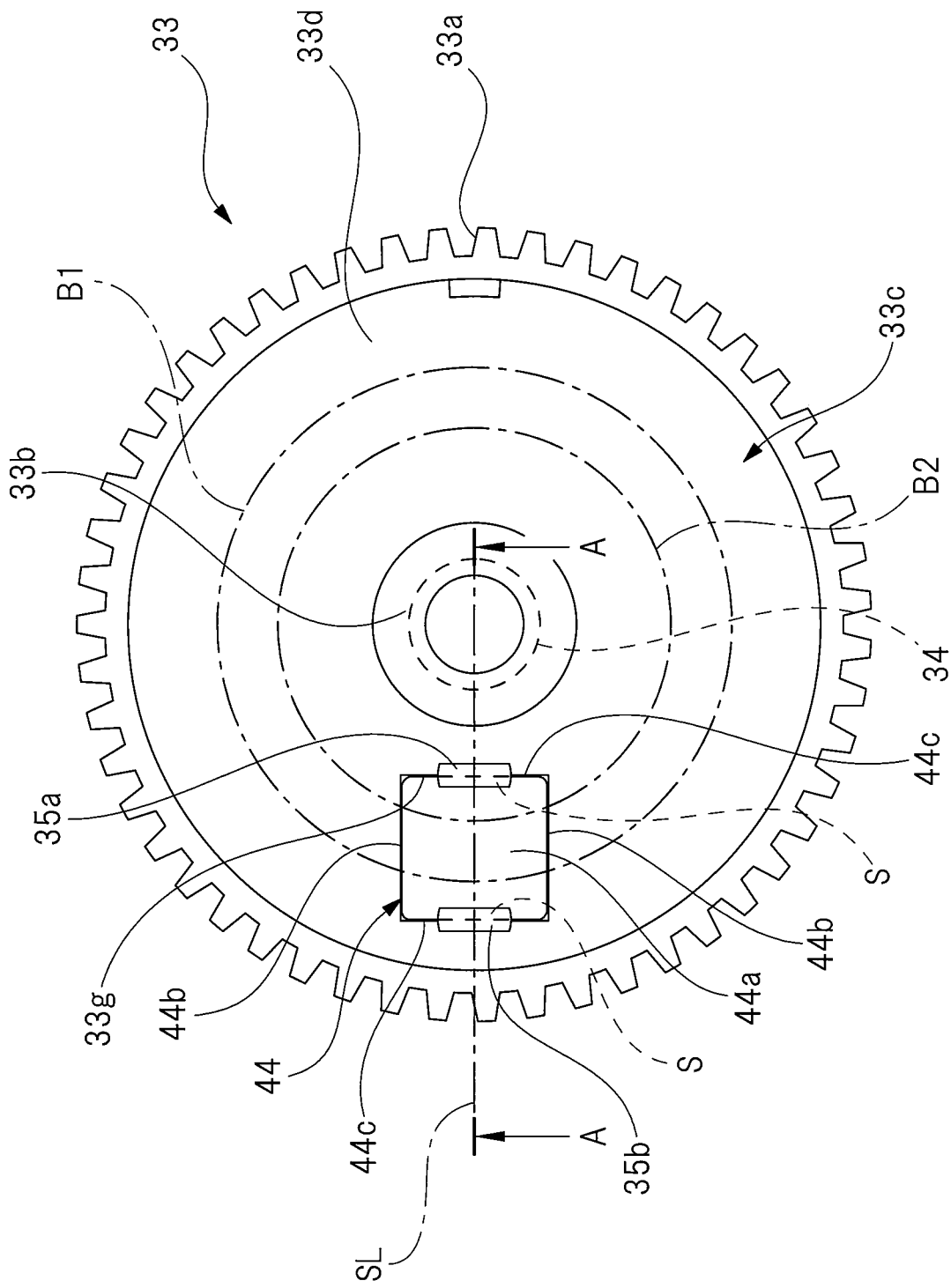
Figure 6:
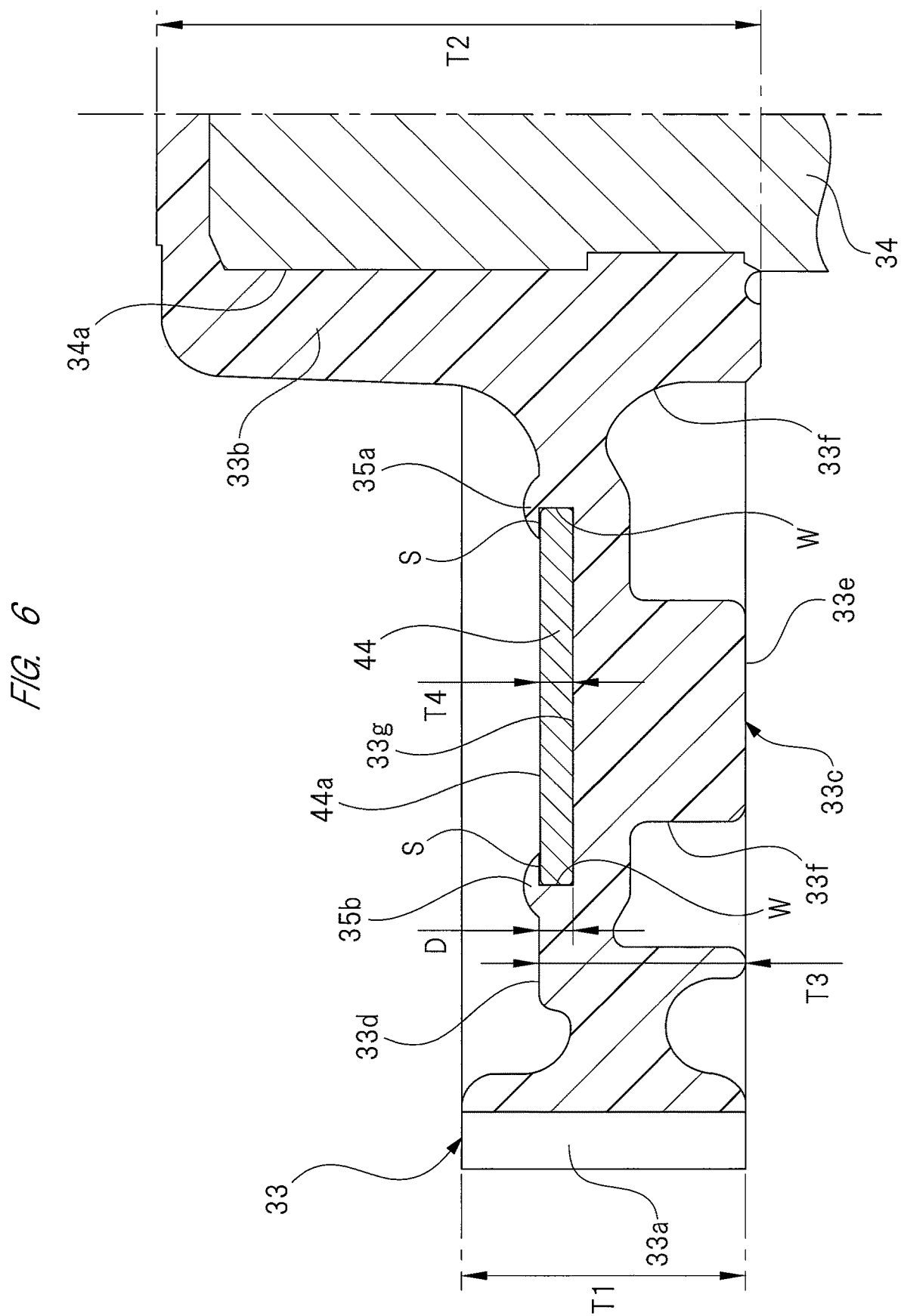
Figure 9:
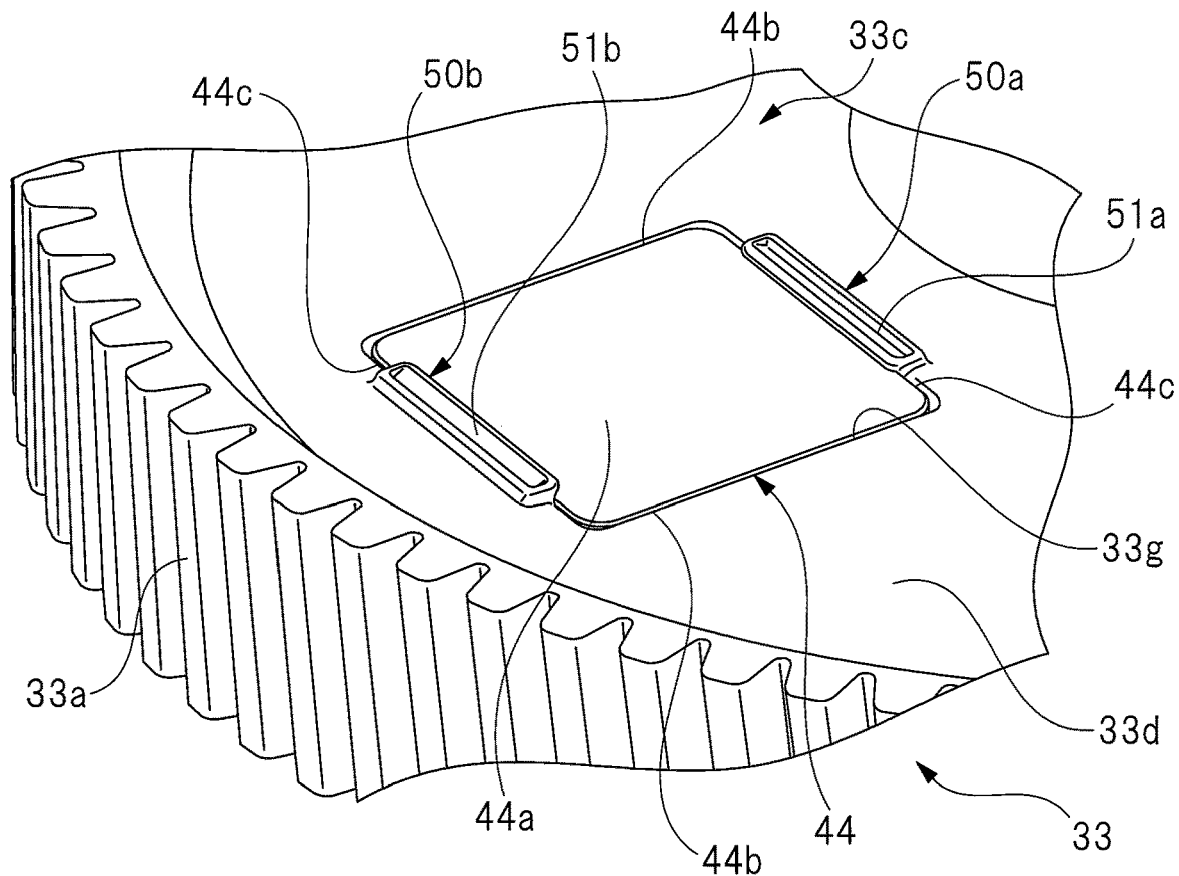
Figure 10:
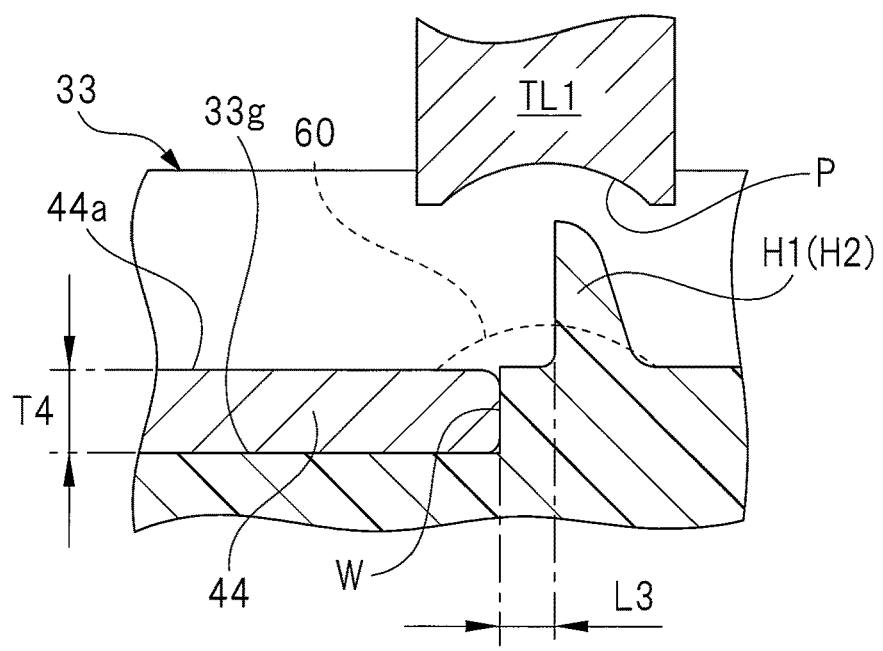
Figure 12:
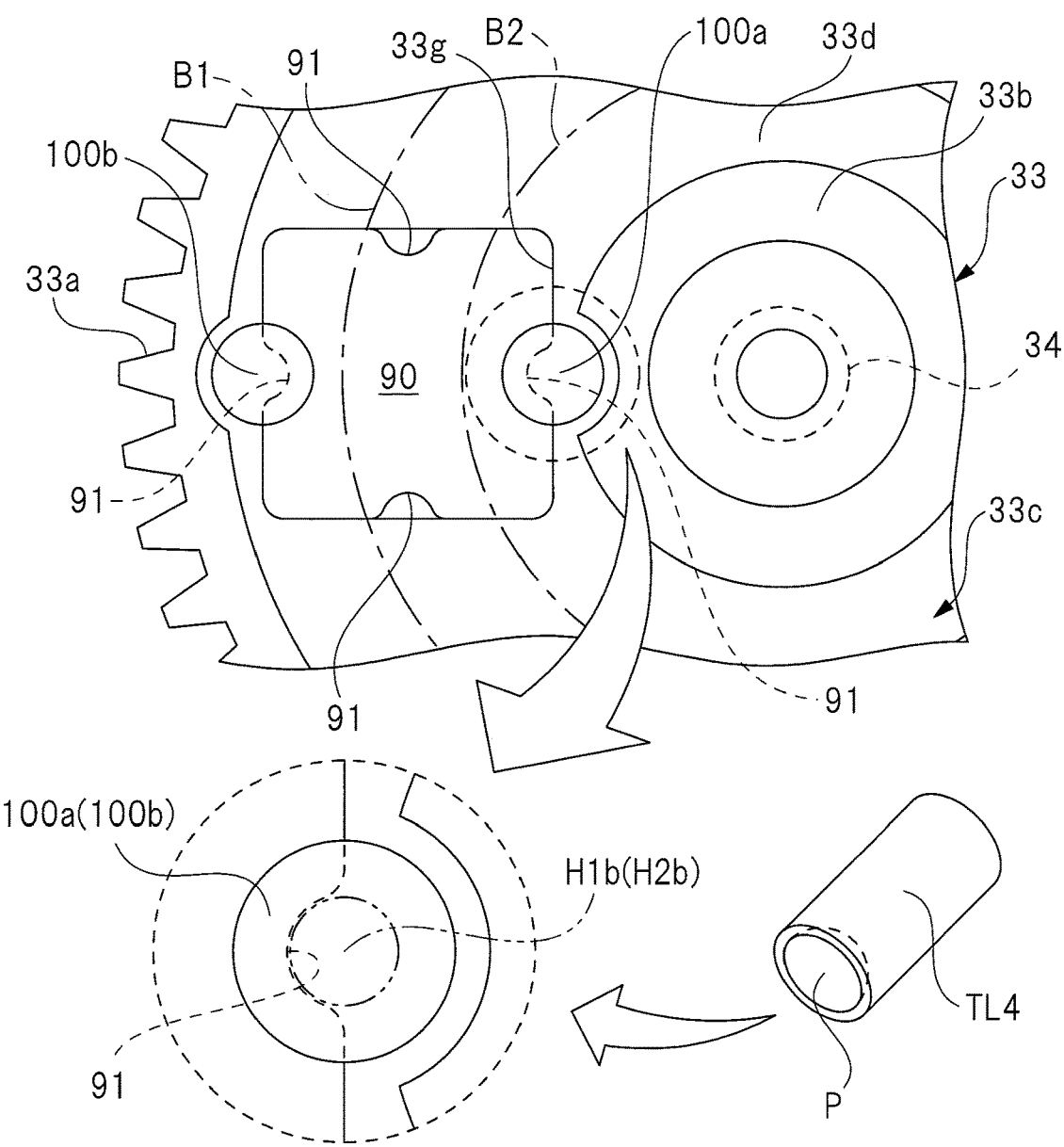
Figure 13:
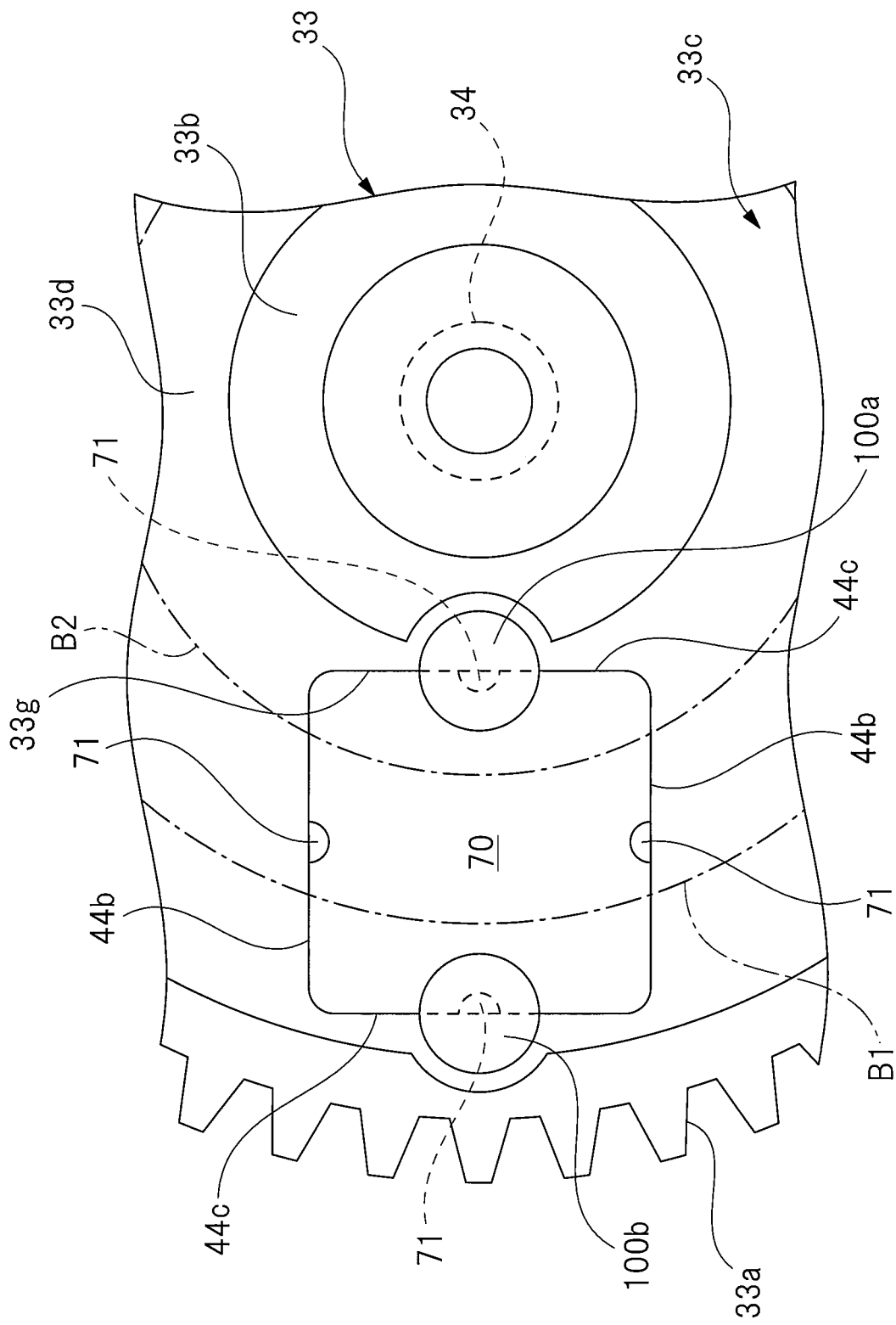
Figure 17:
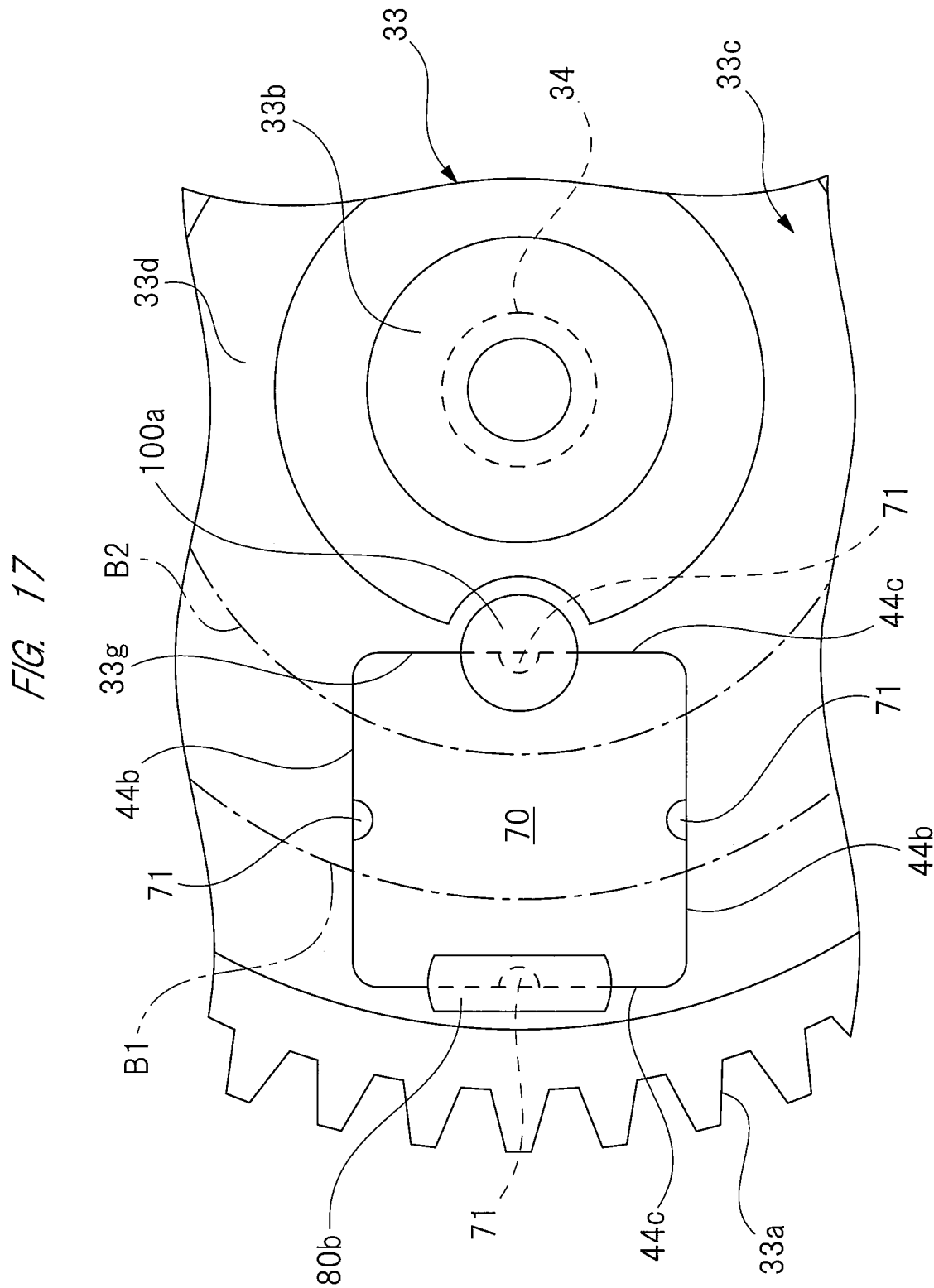
Figure 18:
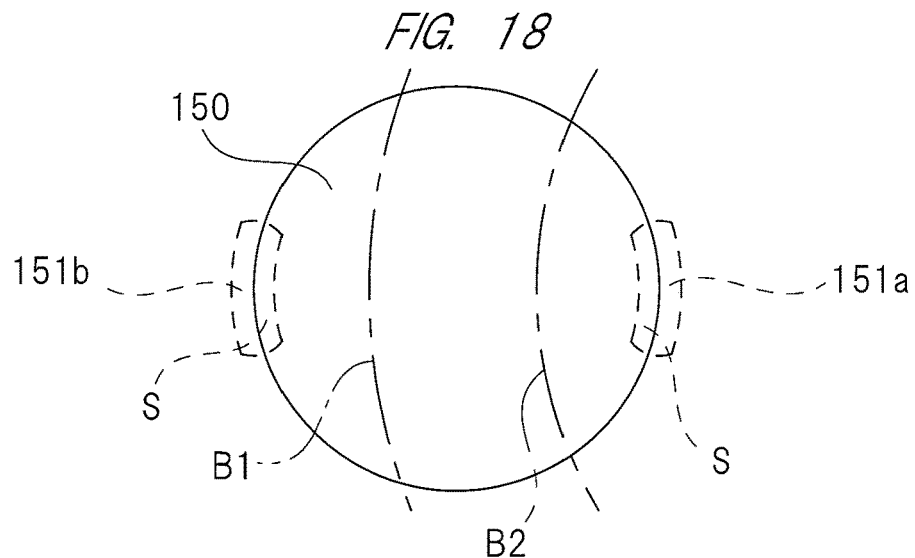
Figure 19:
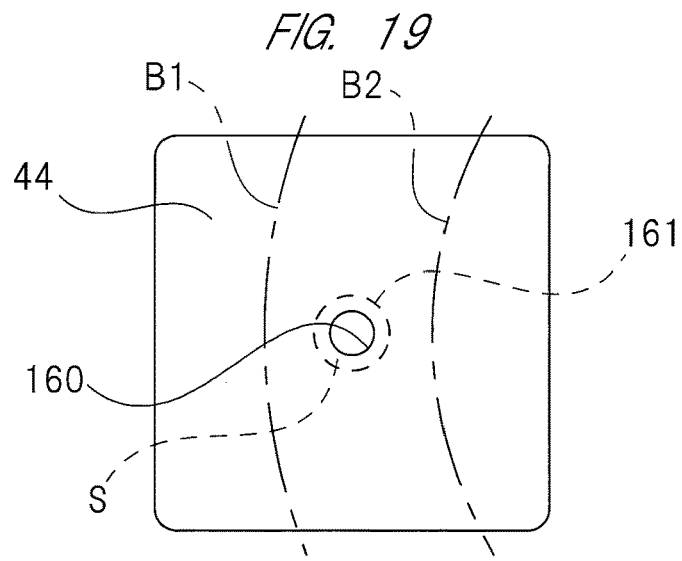
Figure 20:
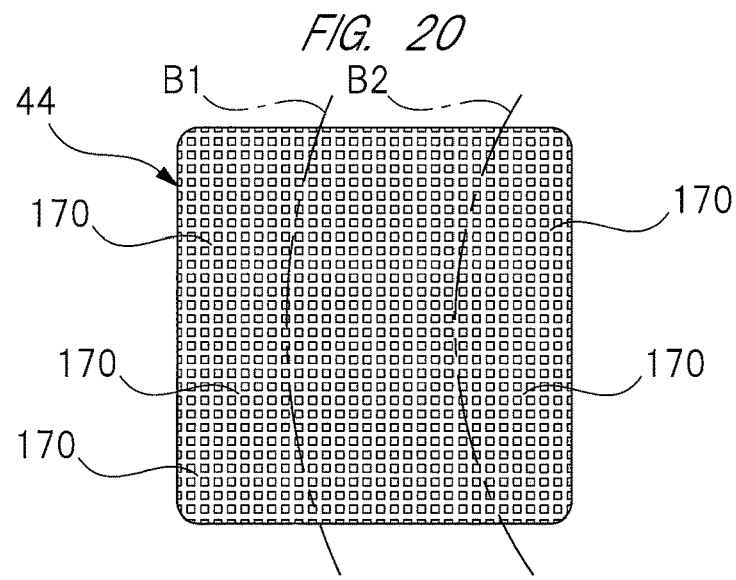
Figure 21:
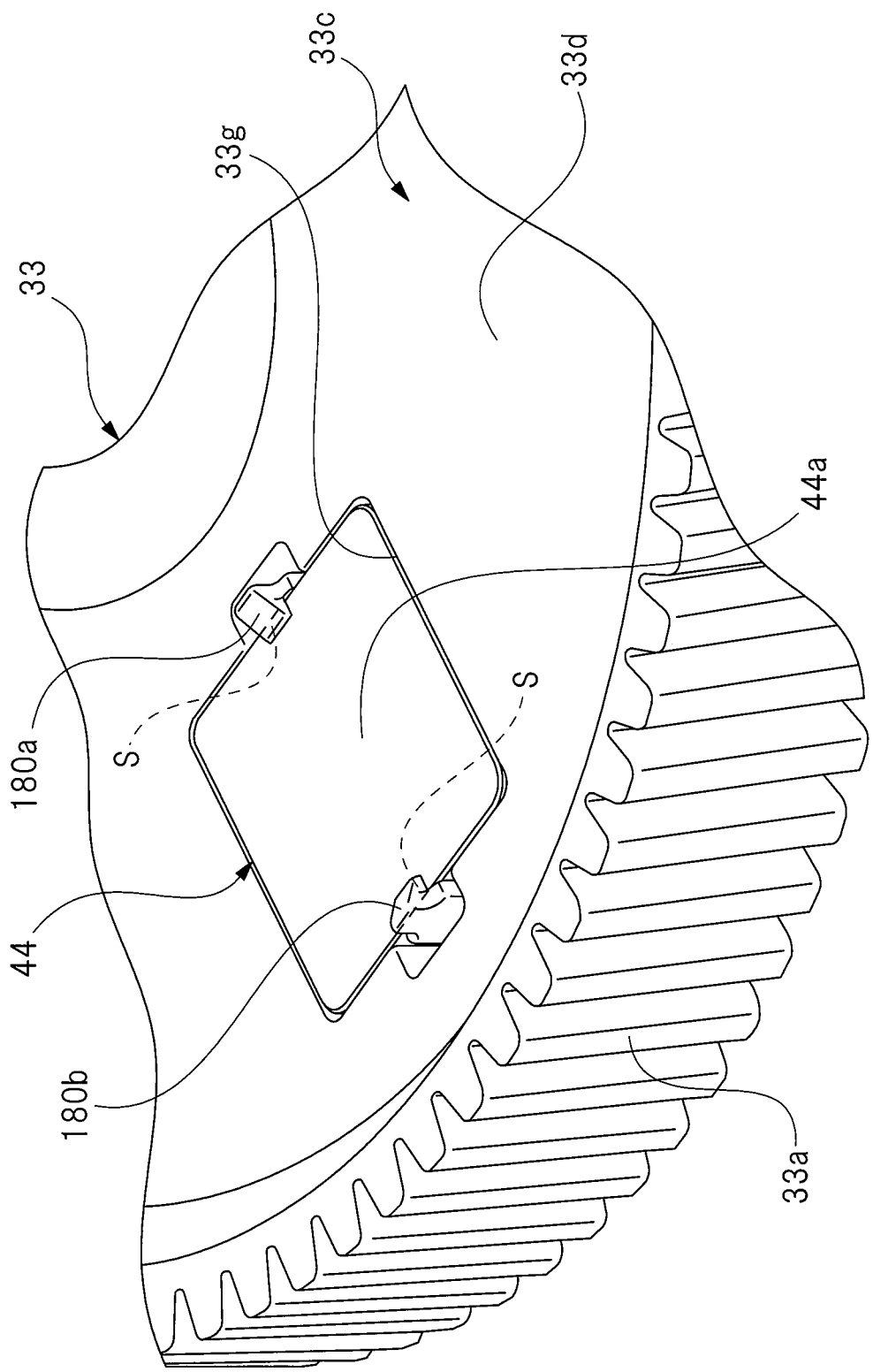
Figure 22:
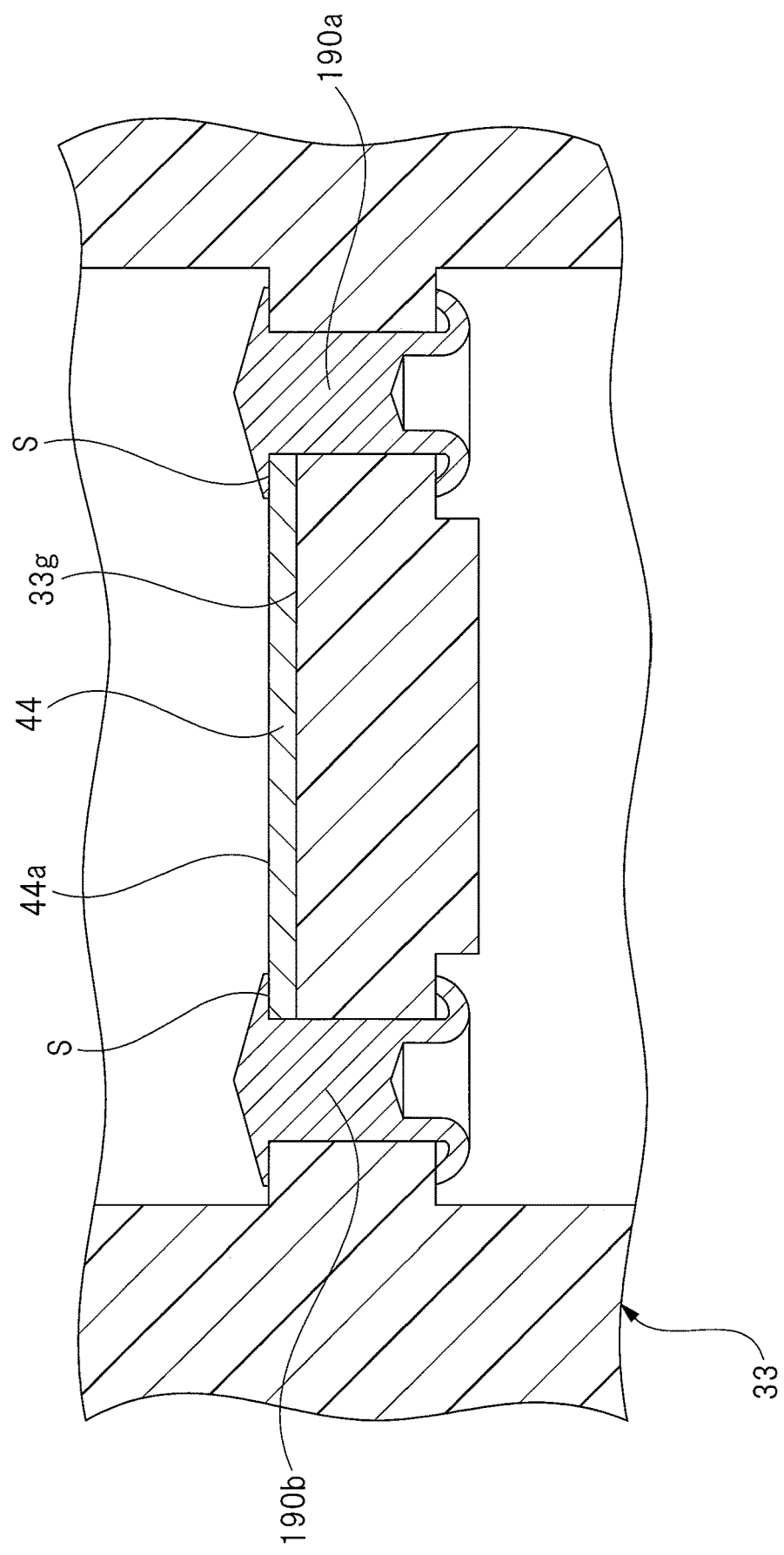
Figure 24:
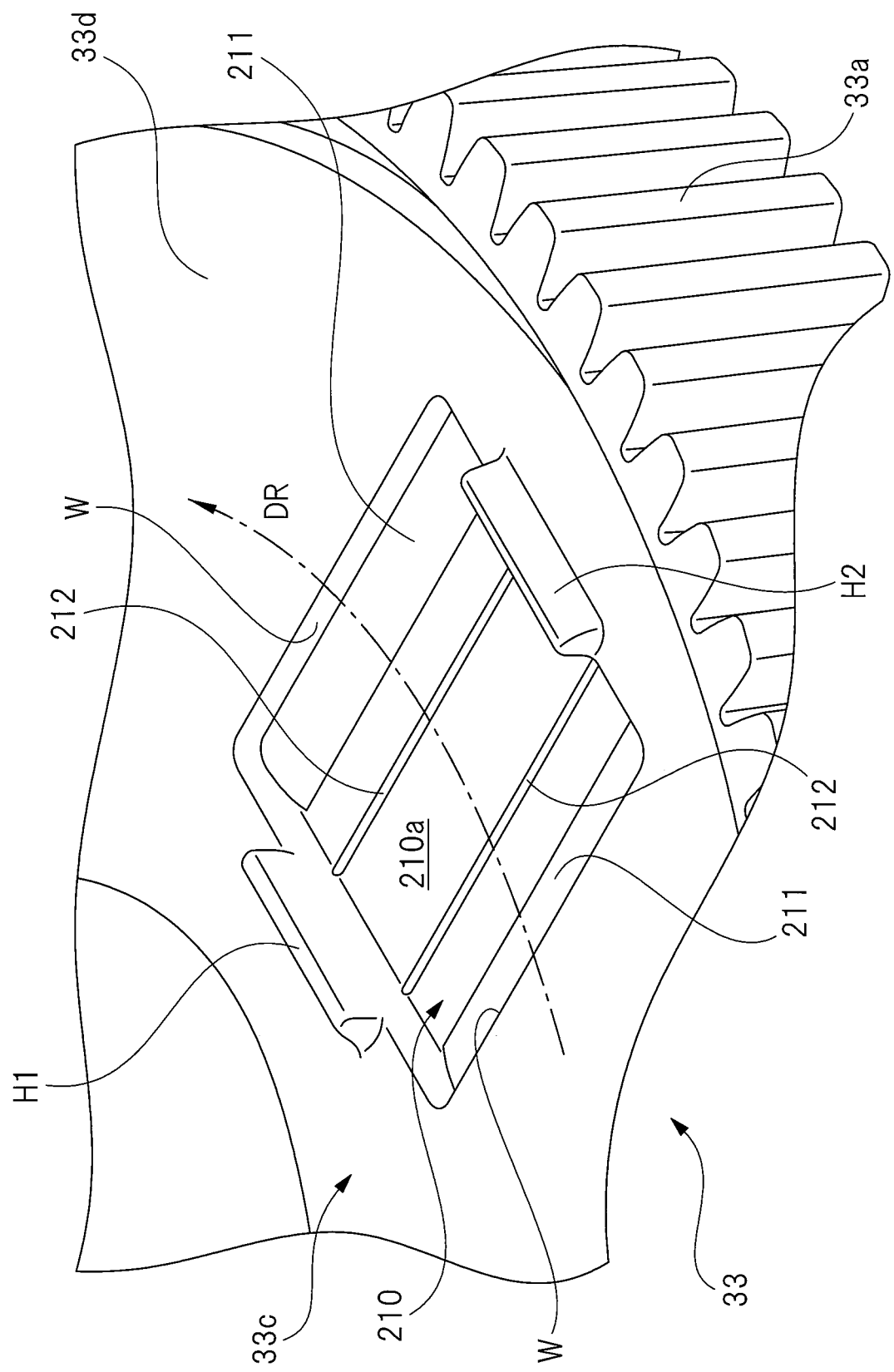
Figure 25:
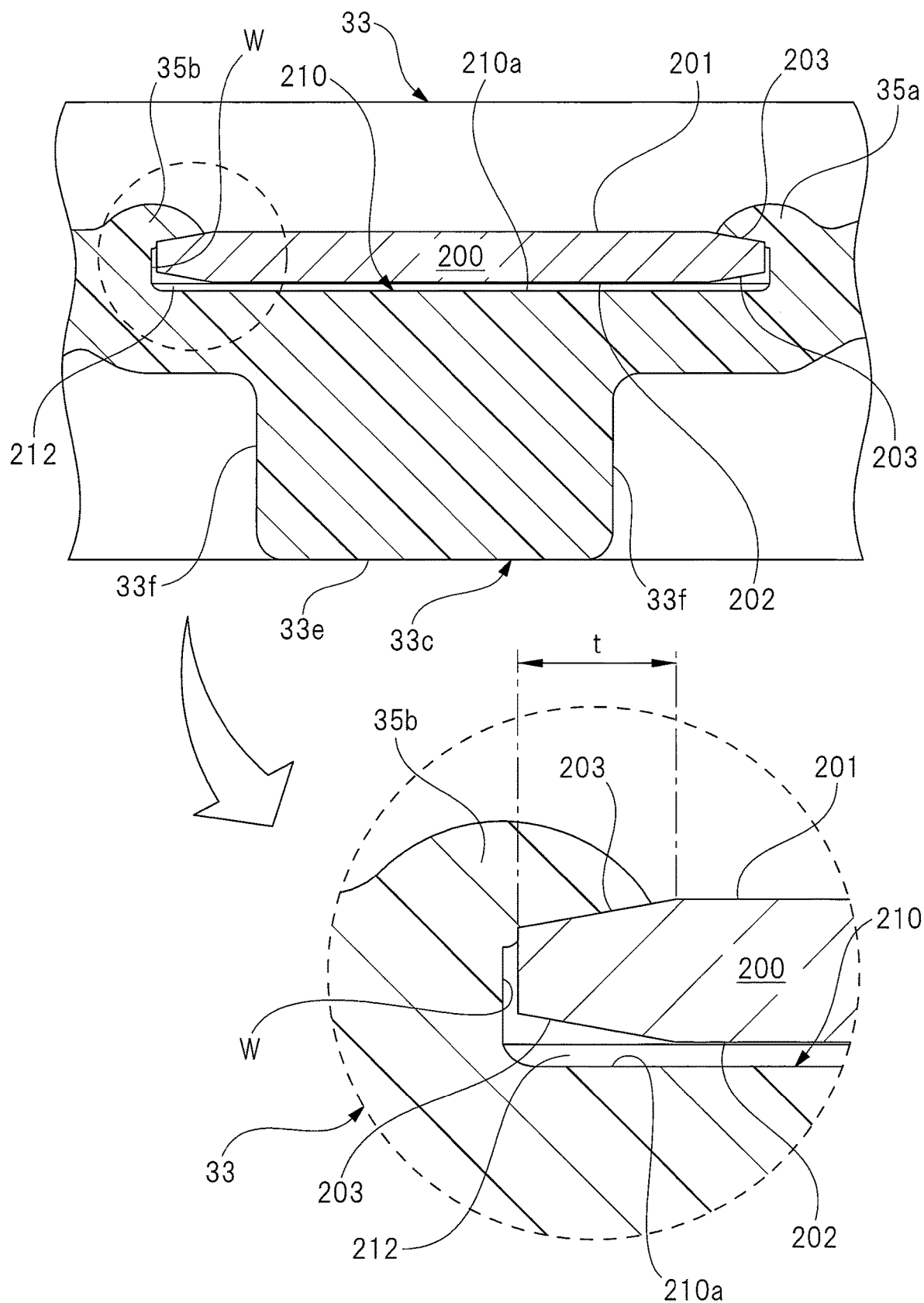
Figure 26:
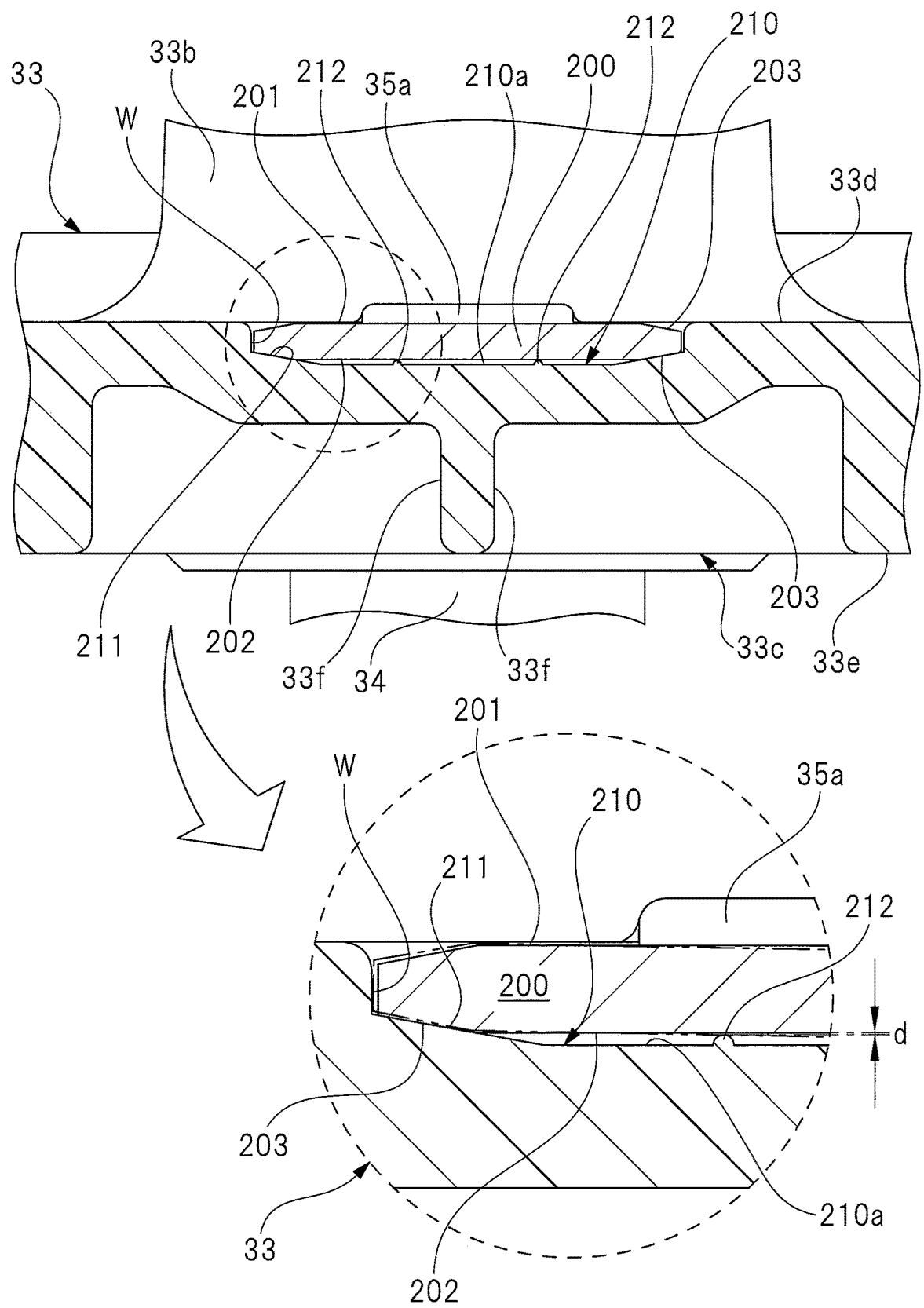
Figure 28:
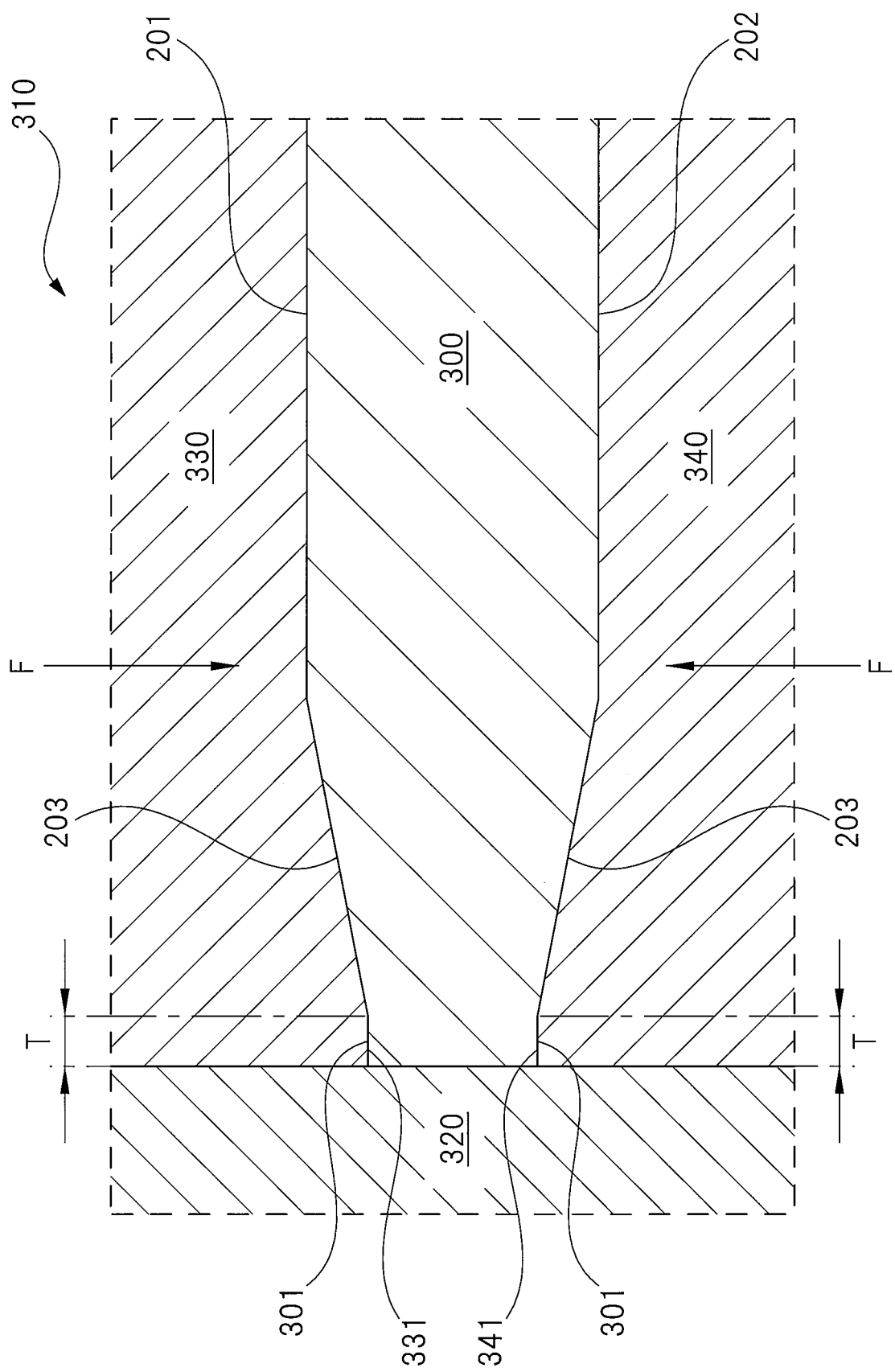
Figure 29:
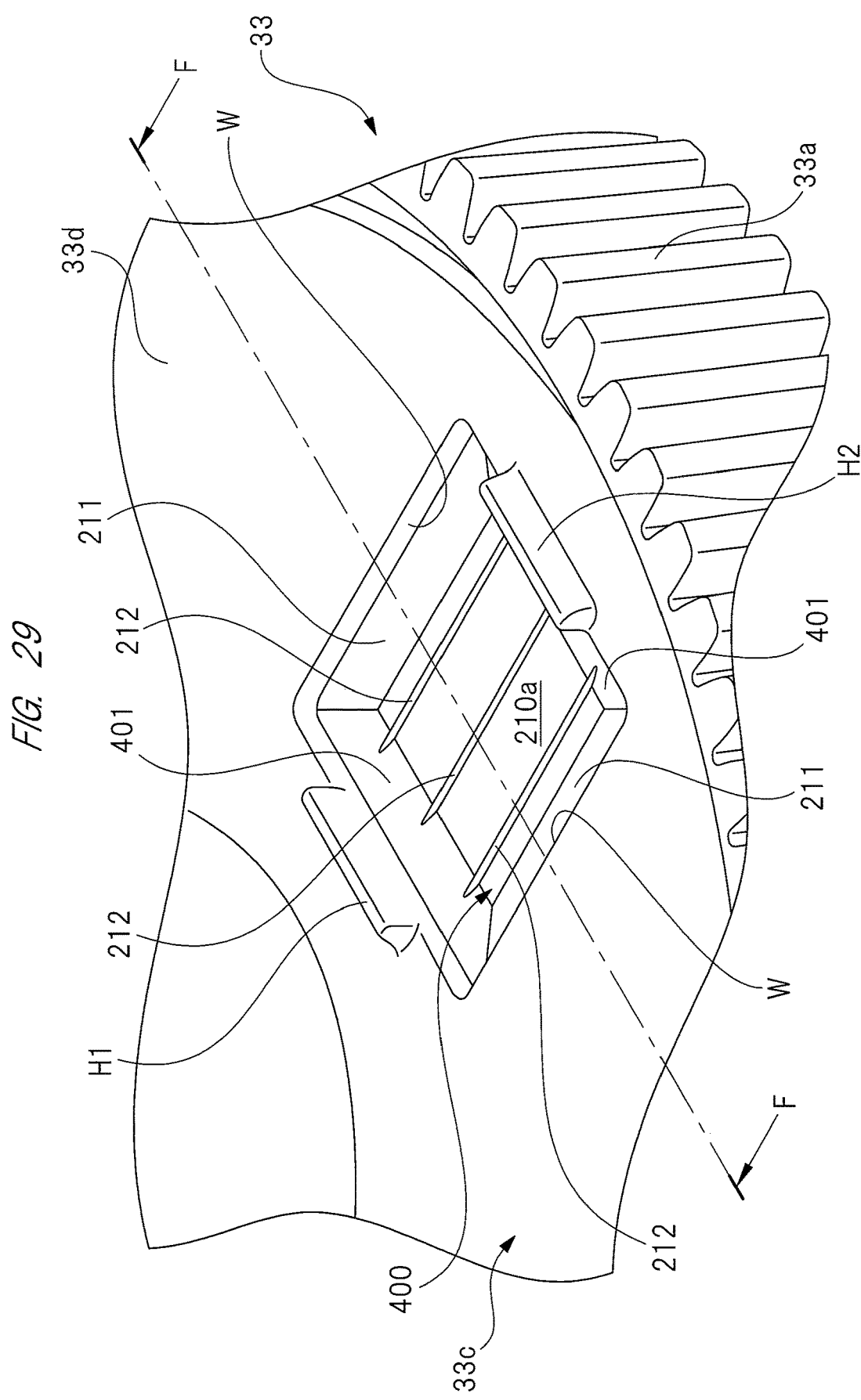
Figure 30:
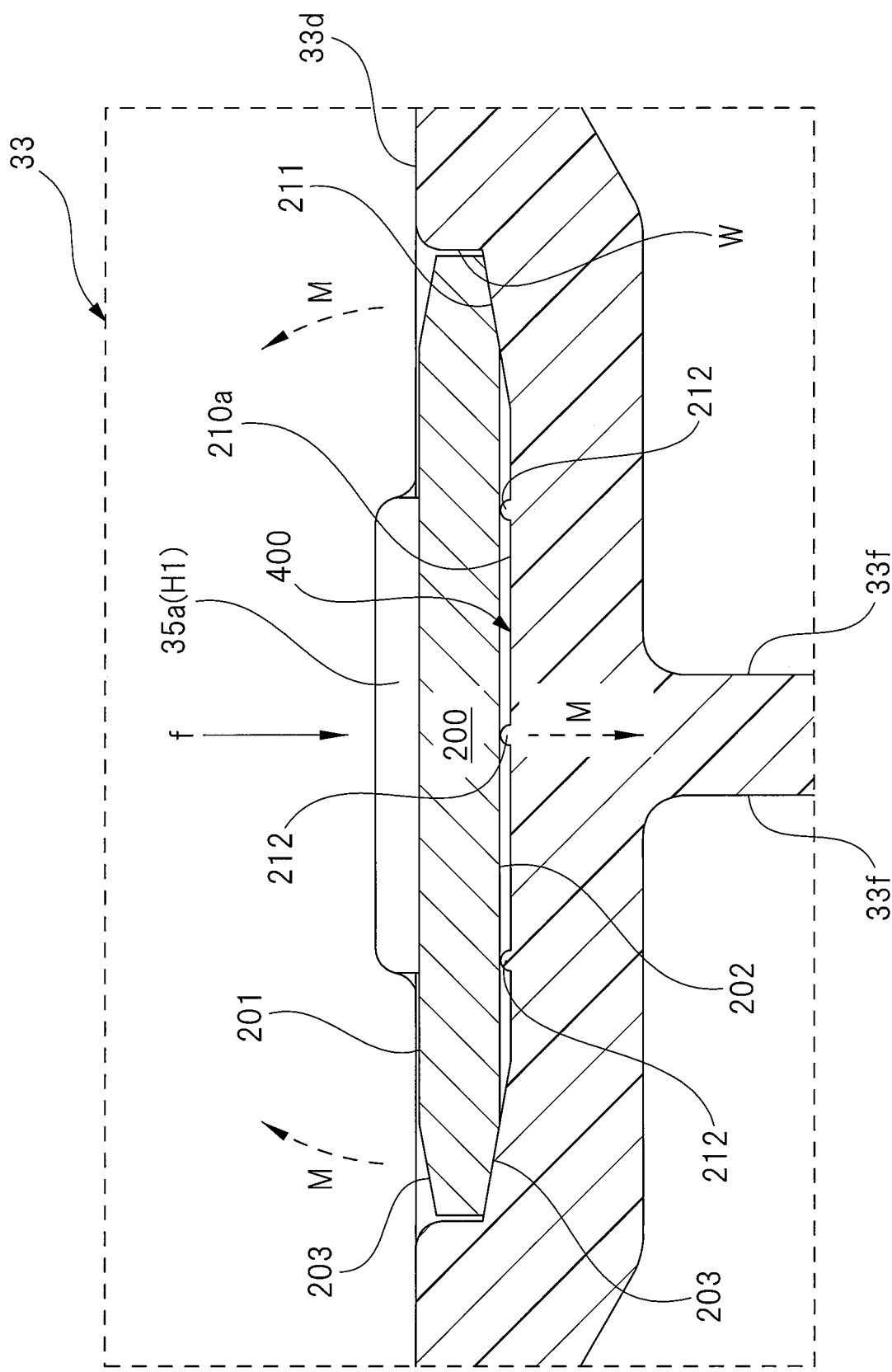
Figure 31:
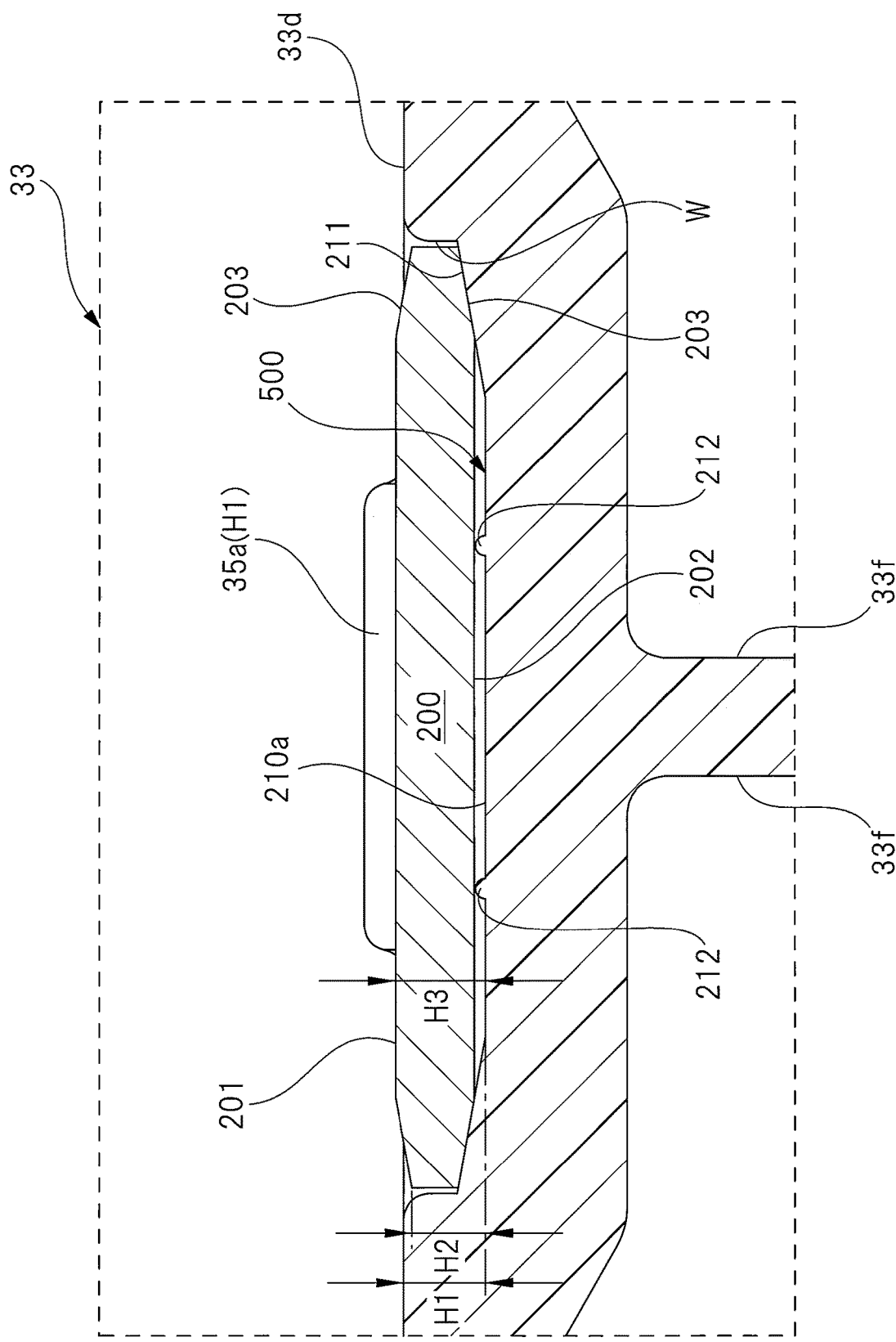

FIGS. 3(a) and 3(b) are perspective views each showing an inside of the wiper motor of FIG. 2.;

FIG. 4 is a perspective view showing a detailed structure of a worm wheel;

FIG. 5 is a top view viewing the worm wheel of FIG. 4 from its axial direction;

FIG. 6 is a sectional view taken along line A-A of FIG. 5;

FIGS. 7(a) and 7(b) are diagrams for explaining a procedure for molding a fixing part;

FIGS. 8(a) and 8(b) are views corresponding to FIG. 7 and showing Embodiment 2;

FIG. 9 is a perspective view showing a fixing part of Embodiment 2;

FIG. 10 is a diagram for explaining a procedure for molding a fixing part of Embodiment 3;

FIGS. 11(a), 11(b) and 11(c) are diagrams for explaining a relay plate and a fixing part of Embodiment 4;

FIGS. 12(a) and 12(b) are diagrams for explaining a relay plate and a fixing part of Embodiment 5;

FIG. 13 is a diagram for explaining a relay plate and a fixing part of Embodiment 6;

FIGS. 14(a) and 14(b) are views corresponding to FIG. 12 and showing Embodiment 7;

FIGS. 15(a) and 15(b) are views corresponding to FIG. 12 and showing Embodiment 8;

FIGS. 16(a) and 16(b) are diagrams for explaining a relay plate and a fixing part of Embodiment 9;

FIG. 17 is a view corresponding to FIG. 13 and showing Embodiment 10;

FIG. 18 is a view showing a relay plate of Embodiment 11;

FIG. 19 is a view showing a relay plate of Embodiment 12;

FIG. 20 is a view showing a relay plate of Embodiment 13;

FIG. 21 is a view corresponding to FIG. 9 and showing Embodiment 14;

FIG. 22 is a view corresponding to FIG. 6 and showing Embodiment 15;

FIGS. 23(a), 23(b) and 23(c) are diagrams for explaining a relay plate and a fixing part of Embodiment 16;

FIG. 24 is a perspective view showing an accommodating concave portion of Embodiment 16;

FIG. 25 is sectional view taken along line D-D of FIG. 23(c);

FIG. 26 is sectional view taken along line E-E of FIG. 23 (c);

FIGS. 27(a) and 27(b) are diagrams for explaining a relay plate of Embodiment 17;

FIG. 28 is a diagram for explaining a procedure for manufacturing the relay plate of FIG. 27;

FIG. 29 is a perspective view showing an accommodating concave portion of Embodiment 18;

FIG. 30 is a sectional view (including a relay plate) taken along line F-F of FIG. 29; and FIG. 31 is a sectional view corresponding to FIG. 26 and explaining Embodiment 19.

DETAILED DESCRIPTION

Hereinafter, Embodiment 1 of the present invention will be described in detail with reference to the drawings.

Figure 1:
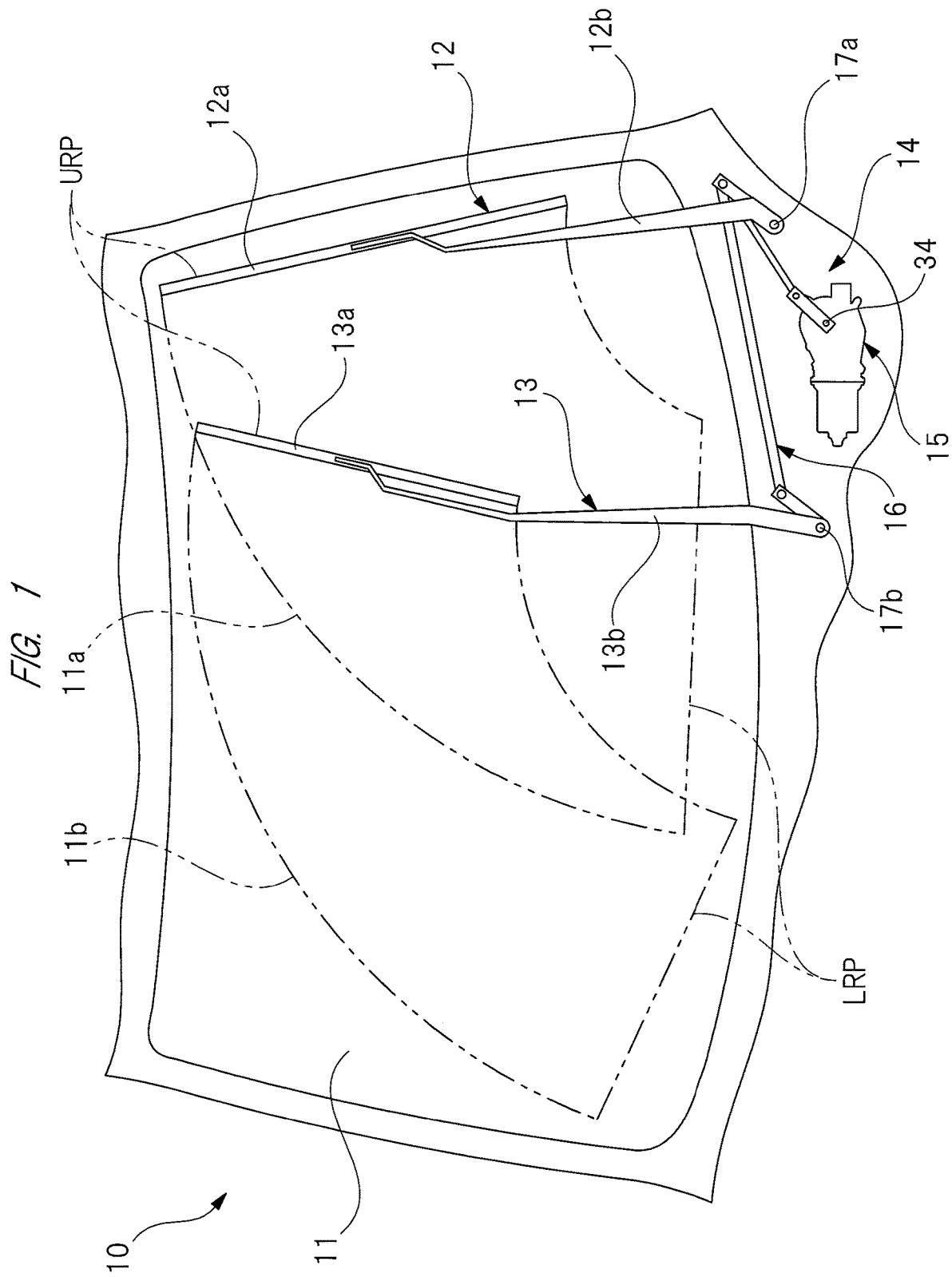
FIG. 1 is a schematic view showing a wiper device to be mounted on a vehicle.

FIG. 1 is a schematic view showing a wiper device to be mounted on a vehicle; FIG. 2 is a top view showing the wiper motor of FIG. 1; FIGS. 3(a) and 3(b) are perspective views each showing an inside of the wiper motor of FIG. 2; FIG. 4 is a perspective view showing a detailed structure of a worm wheel; FIG. 5 is a top view viewing the worm wheel of FIG. 4 from its axial direction; FIG. 6 is a sectional view taken along line A-A of FIG. 5; and FIGS. 7(a) and 7(b) are diagrams for explaining a procedure for forming a fixing part.

As shown in FIG. 1, a windshield 11 is provided on a front side of a vehicle 10. Provided on the windshield 11 are a DR-side wiper member 12 and an AS-side wiper member 13 for wiping rain water etc. that have been attached to the windshield 11. Here, the "DR-side" indicates a driver's seat side, and the "AS-side" indicates a passenger's seat side.

The DR-side wiper member 12 includes a DR-side wiper blade 12a and a DR-side wiper arm 12b. The DR-side wiper blade 12a is rotatably attached on a tip side of the DR-side wiper arm 12b. The AS-side wiper member 13 includes an AS-side wiper blade 13a and an AS-side wiper arm 13b. The AS-side wiper blade 13a is rotatably attached on a tip side of the AS-side wiper arm 13b.

The DR-side and AS-side wiper blades 12a, 13a are elastically contacted with the windshield 11, respectively, by energization force of tension springs (not shown) that are provided inside the DR-side and AS-side wiper arms 12b, 13b.

Additionally, the DR-side and AS-side wiper blades 12a, 13a synchronize with each other and respectively reciprocate in the same direction in DR-side and AS-side wiping ranges 11a, 11b that are formed between a lower inversion position LRP and an upper inversion position URP on the windshield 11. Namely, each of wiping patterns of the DR-side and AS-side wiper blades 12a, 13a is of a tandem type.

A wiper device 14 for swinging the DR-side and AS-side wiper blades 12a, 13a is mounted on the front side of the windshield 11 in the vehicle 10. The wiper device 14 includes: a wiper motor 15 that is driven by an operation of a wiper switch (not shown) provided in the vehicle etc.; and a linkage mechanism 16 that converts a rotational motion of the wiper motor 15 into a swinging motion of each of the DR-side and AS-side wiper blades 12a, 13a.

When an operator operates the wiper switch, the wiper motor 15 is driven to rotate. Consequently, the linkage mechanism 16 is driven to swing, which causes a DR-side pivot shaft 17a and an AS-side pivot shaft 17b provided in the vehicle 10 to swing. Thus, the DR-side and AS-side wiper members 12, 13 fixed to the DR-side and AS-side pivot shafts 17a, 17b are swung on the windshield 11 so that rainwater etc. attached onto the windshield 11 are cleanly be wiped (swept).

As shown in FIGS. 2 and 3, the wiper motor 15 includes a motor unit 20 and a speed reduction mechanism unit 30. Here, each of FIGS. 3(a) and 3(b) shows, for easily understanding an internal structure of the wiper motor 15, a housing cover 32 separately from a motor case 21 by omitting an illustration of the motor case.

The motor unit (motor) 20 has the motor case 21 that is formed into a bottomed cylindrical shape by pressing (deep drawing) a conductive material such as a steel plate. Two permanent magnets 22 are fixed to an inner wall of the motor case 21. An armature 23 is rotatably provided inside these permanent magnets 22 via a predetermined gap, and an armature shaft 24 is fixed to a rotational center of the armature 23. Namely, the motor case 21 rotatably houses (accommodates) the armature 23 and the armature shaft 24.

A base end side (right side in figure) of the armature shaft 24 is supported by a bottom portion 21a of the motor case 21 via a bearing member (not shown). Meanwhile, a tip side (left side in figure) of the armature shaft 24 extends up to an inside of a housing 31 that forms the speed reduction mechanism unit 30. Additionally, a pair of worms 25a, 25b are provided integrally on the tip side of the armature shaft 24. Namely, the pair of worms 25a, 25b are rotated by the rotation of the armature shaft 24.

A commutator 26 formed into a substantially cylindrical shape is fixed between the worm 25 b and the armature 23 along a longitudinal direction of the armature shaft 24. An end of a coil 27 wound around the armature 23 is electrically connected to the commutator 26.

Further, a plurality of brushes 28 (only two brushes are shown in FIG. 3(a)) are slidably contacted with an outer peripheral portion of the commutator 26. Consequently, supplying a drive current to the commutator 26 and the coil 27 via the plurality of brushes 28 brings generation of electromagnetic force around the armature 23, which causes the armature shaft 24 to rotate at predetermined rotational speed and in a predetermined rotational direction.

The speed reduction mechanism unit 30 includes a housing 31 and a housing cover 32. The housing 31 is formed in a substantially bathtub shape by casting and molding a conductive material such as aluminum. As shown in FIG. 2, the housing 31 is coupled to an opening side (left side in figure) of the motor case 21 by a plurality of fastening screws 18 (only two are shown in FIG. 2).

[A worm wheel 33 as a rotating body is rotatably accommodated inside the housing 31. The worm wheel 33 is formed in a substantially disk shape by injection-molding a plastic material such as polyacetal (POM). A base end side of an output shaft 34 made of a steel rod is fixed to a rotational center of the worm wheel 33. Further, a tooth portion 33a that meshes with a pair of counter gears CG1, CG2 is provided radially outside the worm wheel 33.

Here, the pair of counter gears CG1, CG2 are provided between the worm wheel 33 and the pair of worms 25a, 25b. Namely, the worm wheel 33 is rotated by the armature shaft 24 via the pair of counter gears CG1, CG2. The pair of worms 25a, 25b, the pair of counter gears CG1, CG2, and the worm wheel 33 decelerate the rotation of the armature shaft 24 and cause rotational force with high torque to be outputted from the output shaft 34, thereby configuring a speed reduction mechanism SD. Incidentally, the tip side of the output shaft 34 is disposed outside the housing 31, and the linkage mechanism 16 is coupled on the tip side of the output shaft 34 (see FIG. 1).

As shown in FIG. 3(b), an insulator 36 made of an insulating material such as plastic is fixed inside the housing cover 32. A plurality of motor-side terminals 40, a plurality of connector-side terminals 41, a plurality of capacitors 42, and two contact plates 43a, 43b are attached to the insulator 36 by fitting etc. These electronic components form a predetermined electric circuit on the insulator 36. Incidentally, attached to the worm wheel 33 is one relay plate 44 (see FIG. 3(a)) with which the two contact plates 43a, 43b are slidably contacted.

One side (left side in FIG. 3B) of each of the plurality of connector-side terminals 41 in its longitudinal direction is exposed inside a connector connecting portion 32a that is provided integrally with the housing cover 32. Meanwhile, the other side (right side in FIG. 3(b)) of each of the plurality of motor-side terminals 40 in its longitudinal direction is electrically connected to a terminal connecting portion TJ (see FIG. 3(a)) of a brush holder (not shown).

Thus, a drive current is supplied to the plurality of brushes 28 from a vehicle-side external connector (not shown) that is connected to the connector connecting portion 32a. Here, the capacitors 42 for noise suppression are arranged between the motor-side terminal 40 and the connector-side terminal 41.

Additionally, a ground (earth) terminal ET is connected to some of the plurality of connector-side terminals 41, and the ground terminal ET is electrically connected to the housing 31. This effectively releases, to a vehicle body of the vehicle 10 (see FIG. 1), noise generated during actuation of the wiper motor 15. Therefore, noise directly radiated outside from the wiper motor 15 is eliminated so as not to adversely affect other in-vehicle devices etc.

Further, a base end side of one contact plate 43a is electrically connected to some of the plurality of connector-side terminals 41. As shown in FIG. 5, a tip side of the contact plate 43a is slidably contacted on and with a first reference line B1 that lies radially outside a surface 33d of the worm wheel 33.

Additionally, a base end side of the other contact plate 43b is electrically connected to some of the plurality of connector-side terminals 41. As shown in FIG. 5, a tip side of the other contact plate 43b is slidably contacted on and with a second reference line B2 that lies radially inside the surface 33d of the worm wheel 33.

Here, the tip sides (slidably contacting portions) of the contact plates 43a, 43b are respectively arranged on a line segment (see a virtual line SL in FIG. 5) that passes an axial center of the worm wheel 33 and extends radially. Namely, the slidably contacting portions of the contact plates 43a, 43b are arranged in a radial direction of the worm wheel 33. Consequently, the slidably contacting portions of the contact plates 43a, 43b are substantially simultaneously contacted with the relay plate 44 that is provided on the surface 33d of the worm wheel 33.

The relay plate 44 is formed into a plate shape by sintered metal having a myriad of holes (not shown). Specifically, as shown in FIGS. 4 and 5, when the worm wheel 33 is viewed from its axial direction, the relay plate 44 is formed into a substantially square shape. Namely, the relay plate 44 has a vertically and horizontally symmetrical shape when the worm wheel 33 is viewed from the axial direction. In other words, the relay plate 44 has such a point-symmetrical shape as to be centered about the relay plate 44 when the worm wheel 33 is viewed from the axial direction. The relay plate 44 has dimensions of approximately 15 mm in length, 15 mm in width, and 3 mm in thickness. Furthermore, lubricating oil (not shown) is impregnated into each of the myriad of holes of the relay plate 44.

Consequently, the sliding properties of the contact plates 43a, 43b with respect to the relay plate 44 are in goodness. At this time, the lubricating oil in the holes is contacted with the slidably contacting portions of the contact plates 43a, 43b when the contact plates 43a, 43b slidably contact therewith, so that good sliding properties is obtained. Additionally, the lubricating oil that has been contacted with the slidably contacting portions of the contact plates 43a, 43b and has protruded (overflowed) outside from the holes is immediately returned to the other holes. This makes it difficult for the lubricating oil to harden on a slidably contacting surface 44a of the relay plate 44, thereby leading to forming no oil film. Therefore, the relay plate 44 and the contact plates 43a, 43b always have sufficient conductivity properties.

Here, the relay plate 44 includes two sets of sides 44b, 44b and 44c, 44c opposing (facing) each other. Then, as shown in FIG. 5, one set of sides 44c, 44c (two sides in the present invention) of the two sets of sides 44b, 44b and 44c, 44c is arranged on a virtual line SL (same as the line A-A in figure) that passes the axial center of the worm wheel 33 and extends in the radial direction of the worm wheel 33. More specifically, an extending direction (right and left directions in figure) of the virtual line SL and an extending direction (up and down directions in figure) of the one set of sides 44c, 44c are orthogonal to each other.

Incidentally, copper powder is used as a main material of the sintered metal for forming the relay plate 44 in the present embodiment. In order to increase hardness of the relay plate 44, predetermined amounts of tin and nickel powder are also blended (mixed). Further, in order to secure wear resistance of the relay plate 44, a predetermined amount of solid lubricant such as graphite or molybdenum disulfide is also blended.

However, the main material of the sintered metal is not limited to copper, and other kinds of metal may be used. A mixing ratio of tin, nickel, and solid lubricant, and presence or absence of the mixing may be arbitrarily set according to specifications to be required.

A procedure for molding (forming) the relay plate 44 made of such sintered metal is as follows. First, powdered copper, tin, nickel, and solid lubricant, etc. are blended and mixed to form a sintered material. Next, the sintered material is put into a molding die, compressed, and formed (molded) into a predetermined shape. Incidentally, each size and the number of holes in its completed product can be adjusted depending on a degree of compression in the molding die.

Thereafter, heat is applied to the pressed and compacted sintered material to sinter the sintered material. Consequently, the relay plate 44 having the myriad of holes is molded. After the sintering, sizing and coining processings may be performed to correct dimensional accuracy and warpage, etc. of the relay plate 44. Next, by impregnating the lubricating oil into the relay plate 44, the lubricating oil is impregnated into the holes and the relay plate 44 is finally completed.

As shown in FIGS. 4 to 6, the relay plate 44 is provided on the surface 33d of the worm wheel 33. Specifically, the relay plate 44 is disposed between the output shaft 34 of the worm wheel 33 and the tooth portion 33a. The first reference line B1 and second reference line B2 are arranged on the slidably contacting surface 44a of the relay plate 44. Namely, when the relay plate 44 rotates about the output shaft 34 according to the rotation of the worm wheel 33, the slidably contacting portions of the contact plates 43*a*, 43*b* are contacted with the slidably contacting surface 44*a* of the relay plate 44 each time the worm wheel 33 rotates once. Thus, the contact plates 43*a*, 43*b* are short-circuited to each other.

Here, an in-vehicle controller (not shown) is electrically connected to the vehicle-side external connector. When the operator performs a turning-off operation to the wiper switch to stop the wiper motor 15 (see FIG. 1) and, at this time, if the slidably contacting portions of the contact plates 43*a*, 43*b* lie in areas where the relay plates 44 on the first reference line B1 and second reference line B2 are absent, the in-vehicle controller continuously rotates the wiper motor 15 without stopping the wiper motor.

Thereafter, when the in-vehicle controller detects that the slidably contacting portions of the contact plates 43*a*, 43*b* are respectively contacted with the slidably contacting surfaces 44*a* of the relay plates 44 and that the contact plates 43*a*, 43*b* are short-circuited to each other, it stops power supplied to the wiper motor 15 to stop the rotation of the armature shaft 24.

Consequently, the DR-side wiper member 12 and the AS-side wiper member 13 (see FIG. 1) are stored in predetermined storage positions, and are automatically stopped at the storage positions. Namely, timing (short-circuiting timing) when the slidably contacting portions of the contact plates 43*a*, 43*b* reach (arrive at) the slidably contacting surfaces 44*a* of the relay plates 44 becomes timing the DR-side wiper member 12 and the AS-side wiper member 13 are stored at the storage position.

As shown in FIG. 6, a tooth portion 33*a* is provided radially outside the worm wheel 33. Further, a boss portion 33*b* to which the output shaft 34 is fixed is provided at a radially-inside axial central portion of the worm wheel 33. A substantially disk-shaped main body portion 33*c* is provided between the tooth portion 33*a* of the worm wheel 33 and the boss portion 33*b*. Here, a thickness dimension T1 of the tooth portion 33*a* along the axial direction of the worm wheel 33 is smaller than a thickness dimension T2 of the boss portion 33*b* (T1<T2), and a thickness dimension T3 of the main body portion 33*c* is smaller than the thickness dimension T1 of the tooth portion 33*a* (T3<T1).

Then, a serration portion 34*a* (not shown in detail) is formed on the base end side (upper side in figure) of the output shaft 34, and the serration portion 34*a* is firmly (tightly) fixed radially inside the boss portion 33*b*. Thus, the output shaft 34 is rotated by the rotation of the worm wheel 33.

Additionally, a plurality of thinned portions 33*f* are formed on a back surface 33*e* side of the main body portion 33*c* opposite to a front surface 33*d* side thereof. These thinned portions 33*f* realizes weight reduction of the worm wheel 33 and, simultaneously, prevent the worm wheel 33 from being distorted due to shrinkage during a cure period of the worm wheel when the worm wheel 33 is injection-molded.

The main body portion 33*c* is provided with an accommodating concave portion 33*g* that is recessed from its front surface 33*d* toward its back surface 33*e* (recessed toward the axial direction of the worm wheel 33). The relay plate 44 is housed in the accommodating concave portion 33*g*. Consequently, when the worm wheel 33 is viewed from its axial direction, the accommodating concave portion 33*g* is also formed into a substantially square shape. A size (dimension) of the accommodating concave portion 33*g* is set at such a size (dimension) that the relay plate 44 can be housed therein without rattling.

A depth dimension D of the accommodating concave portion 33*g* is about 0.55 mm, and a thickness dimension T4 of the relay plate 44 is about 0.5 mm (D>T4). Setting of those dimensions make it possible for the contact plates 43*a*, 43*b* to smoothly be slidably contacted on and with the first reference line B1 and second reference line B2 without being caught by the hard relay plate 44 made of sintered metal. Thus, wear (abrasion) of the contact plates 43*a*, 43*b* is suppressed.

The relay plate 44 housed in the accommodating concave portion 33*g* is fixed by a first fixing part (fixing part) 35*a* and a second fixing part (fixing part) 35*b*. These first and second fixing parts 35*a*, 35*b* are provided around the accommodating concave portion 33*g* and protrude in a direction intersecting with (orthogonal to) the axial direction of the worm wheel 33. Specifically, the first and second fixing parts 35*a*, 35*b* are provided in the vicinity of (near) a wall W of the accommodating concave portion 33*g* and protrude in a radial direction of the worm wheel 33. Incidentally, the first and second fixing parts 35*a*, 5*b* are provided integrally with the worm wheel 33, respectively.

Additionally, as shown in FIG. 5, each of the first and second fixing parts 35*a*, 35*b* covers a part of a non-slidably contacting surface in the slidably contacting surface 44*a* of the relay plate 44, the non-slidably contacting surface being a surface with which the contact plates 43*a*, 43*b* is not slidably contacted. Namely, the first and second fixing parts 35*a*, 35*b* are parts that avoid contacting with the first reference line B1 and second reference line B2 on the slidably contacting surface 44*a* of the relay plate 44 and that cover non-slidably contacting surfaces S lying in the vicinity of the one set of sides 44*c*, 44*c* of the relay plate 44.

Further, as shown in FIG. 5, these first and second fixing parts 35*a*, 35*b* are arranged on a virtual line SL that passes the axial center of the worm wheel 33 and extends in the radial direction of the worm wheel 33. Then, the first fixing part 35*a* constitutes one fixing part of the present invention and, as shown in FIG. 6, is provided radially inside the worm wheel 33 and protrudes radially outside the worm wheel 33. In contrast thereto, the second fixing part 35*b* constitutes the other fixing part of the present invention and, as shown in FIG. 6, is provided radially outside the worm wheel 33 and protrudes radially inside the worm wheel 33.

As shown in FIG. 5, each of the first and second fixing parts 35*a*, 35*b* is formed into a substantially rectangular shape and extends along each of the set of sides 44*c*, 44*c* when the worm wheel 33 is viewed from its axial direction. Then, as shown in FIG. 4, each length dimension L1 of the first and second fixing parts 35*a*, 35*b* is longer than half of each length dimension L2 (approximately 15 mm) of the set of sides 44*c*, 44*c* (L1>L2/2). Consequently, rattling in the accommodating concave portion 33*g* of the relay plate 44 is effectively suppressed.

Next, a method of manufacturing the wiper motor 15 formed as described above, particularly, a procedure for attaching the relay plate 44 into the accommodating concave portion 33*g* will be described in detail with reference to the drawings.

[Relay Plate Housing Step]

First, as shown in FIG. 7(*a*), the worm wheel 33 before the first and second fixing parts 35*a*, 35*b* are formed is prepared. Specifically, prepared around the accommodating concave portion 33*g* is the worm wheel 33 that is provided with a first heat receiving portion (heat receiving portion) H1 and a second heat receiving portion (heat receiving portion) H2 to subsequently become the first and second fixing parts 35*a*,

35*b*. The relay plate 44 manufactured in another manufacturing process is also prepared.

Next, as shown by an arrow M1, while the relay plate 44 is faced to the accommodating concave portion 33*g* from the axial direction (up and down direction in figure) of the worm wheel 33, the relay plate 44 is housed in the accommodating concave portion 33*g*. At this time, since the first and second heat receiving portions H1, H2 become protruded in the axial direction of the worm wheel 33, they do not hinder housing work of the relay plate 44 into the accommodating concave portion 33*g* from being performed. Further, the slidably contacting surface 44*a* of the relay plate 44 is made flush with the surface 33*d* of the main body portion 33*c*. Thus, the relay plate housing step is completed.

[Relay Plate Fixing Step]

Thereafter, as shown in FIG. 7(*a*), a pair of thermal caulking jigs TL1 is lowered as shown by an arrow M2 while being heated. Here, a pressing part P concaved to have an arc shape is formed on a bottom surface (lower surface in figure) of each thermal caulking jig TL1, and these pressing parts P are abutted on tip portions (upper portions in figure) of the first and second heat receiving portions H1, H2. At this time, the pair of thermal caulking jigs TL1 are pressed with predetermined pressure so as to urge (promote) thermal deformation of the first and second heat receiving portions H1, H2.

By doing so, the first and second heat receiving portions H1, H2 are thermally deformed according to the arc shapes of the pressing parts P and become states as shown in FIG. 7(*b*). Specifically, as the pair of thermal caulking jigs TL1 descends, the first and second heat receiving portions H1, H2 follow the arc shapes of the pressing parts P as indicated by an arrow M3 in a dashed circle and are folded so as to be curved. Next, the pair of thermal caulking jigs TL1 is separated from the surface 33*d* of the main body portion 33*c* as indicated by an arrow M4. Consequently, the first and second heat receiving portions H1 and H2 that have been heated and thermally deformed become the first and second fixing parts 35*a*, 35*b*, and cover the non-slidable contacting surfaces S in the slidably contacting surface 44*a* of the relay plate 44. Thus, fixing of the relay plate 44 to the accommodating concave portion 33*g* is completed.

As detailed above, in the wiper motor 15 according to the present embodiment, the relay plate 44 has a vertically and horizontally symmetrical shape when the worm wheel 33 is viewed from the axial direction; the accommodating concave portion 33*g* for housing the relay plate 44 so as to face its axial direction is provided in the worm wheel 33; and parts of non-slidably contacting surfaces in the slidably contacting surface 44*a* of the relay plate 44, i.e., the non-slidably contacting surfaces S are covered with the first and second fixing parts 35*a*, 35*b* that are provided around the accommodating concave portion 33*g* and protrude in a direction intersecting with the axial direction of the worm wheel 33, the non-slidably contacting surfaces being a surfaces with which the contact plates 43*a*, 43*b* are not slidably contacted.

This makes it possible to form the relay plate 44 into a simple shape with no directionality and to be easily molded from a porous material such as sintered metal. Since the relay plate 44 is formed of the sintered metal, the lubricating oil can be impregnated thereinto and the replay plate can secure sufficient sliding and conductivity properties.

Additionally, the relay plate 44 can be easily fixed to the worm wheel 33 without rattling and without depending on the conventional locking pawl.

Further, since the first and second fixing parts 35*a*, 35*b* are formed by thermally deforming the parts of the worm wheel 33, a separate component(s) for fixing the relay plate 44 becomes unnecessary and the number of components of the wiper motor can be reduced.

Furthermore, since the relay plate 44 can be made to have a simple shape by using the sintered metal, a density balance of powder as a raw material can be easily uniformized.

Moreover, in the wiper motor 15 according to the present embodiment, the first and second fixing parts 35*a*, 35*b* are provided on the virtual line SL that passes the axial center of the worm wheel 33 and extends in the radial direction of the worm wheel 33; the first fixing part 35*a* protrudes toward a radially outward side of the worm wheel 33; and the second fixing part 35*b* protrudes toward a radially inward side of the worm wheel 33.

This makes it possible to secure, with sufficient areas (sufficient widths) on the slidably contacting surface 44*a* of the relay plate 44, the first reference line B1 and second reference line B2 (see FIG. 5) with which the contact plates 43*a*, 43*b* are slidably contacted.

Further, in the wiper motor 15 according to the present embodiment, when the worm wheel 33 is viewed from the axial direction, the relay plate 44 is formed into a substantially square shape and the set of sides 44*c*, 44*c* in the two sets of sides 44*b*, 44*b* and 44*c*, 44*c* are arranged on the virtual line SL that passes the axial center of the worm wheel 33 and extends in the radial direction of the worm wheel 33.

This also makes it possible to secure, with sufficient areas (sufficient widths) on the slidably contacting surface 44*a* of the relay plate 44, the first reference line B1 and second reference line B2 (see FIG. 5) with which the contact plates 43*a*, 43*b* are slidably contacted.

Further, in the wiper motor 15 according to the present embodiment, when the worm wheel 33 is viewed from the axial direction, the first and second fixing parts 35*a*, 35*b* are formed into substantially rectangular shapes and the first and second fixing parts 35*a*, 35*b* extend along each of the set of sides 44*c*, 44*c* and become longer in length than half a length dimension of each of the set of sides 44*c*, 44*c* (L1>L2/2 in FIG. 4).

This also makes it possible to secure, with sufficient areas (sufficient widths) on the slidably contacting surface 44*a* of the relay plate 44, the first reference line B1 and second reference line B2 (see FIG. 5) with which the contact plates 43*a*, 43*b* are slidably contacted. Additionally, the rattling of the relay plate 44 in the accommodating concave portion 33*g* can be effectively suppressed.

Next, Embodiment 2 of the present invention will be described in detail with reference to the drawings. Incidentally, portions having almost the same functions as those in Embodiment 1 described above are denoted by the same reference numerals, and detailed description thereof will be omitted.

FIGS. 8(*a*) and 8(*b*) illustrate views corresponding to FIG. 7 and showing Embodiment 2, and FIG. 9 illustrates a perspective view showing a fixing part of Embodiment 2.

As shown in FIGS. 8 and 9, Embodiment 2 is different from Embodiment 1 in: shapes of first and second heat receiving portions H10, H20; shapes of first and second fixing parts 50*a*, 50*b*; and a shape of a thermal caulking jig TL2 used for molding (shaping) the first and second fixing parts 50*a*, 50*b*.

As shown in FIG. 8(*a*), the first and second heat receiving portions H10, H20 are each formed so that each cross-section thereof has a substantially trapezoidal cross-section. An area of a connecting surface between each of the first and second heat receiving portions H10, H20 and the worm wheel 33 becomes about 1.5 times larger than an area of a connecting surface between each of the first and second heat receiving portions H1, H2 of Embodiment 1 (see FIG. 7) and the worm wheel 33. Additionally, each height dimension of the first and second heat receiving portions H10, H20 along the axial direction of the worm wheel 33 becomes about half (about ½) larger than each height dimension of the first and second heat receiving portions H1, H2 of Embodiment 1 along the axial direction of the worm wheel 33.

As shown in FIG. 9, when the worm wheel 33 is viewed from the axial direction, the first and second fixing parts (fixing parts) 50a, 50b are formed into substantially rectangular shapes and respectively extend along the set of sides 44c, 44c. Additionally, the first and second fixing parts 50a, 50b are provided with first and second concave portions 51a, 51b along their longitudinal directions.

Additionally, bottom surfaces (lower surface in figure) of the thermal caulking jigs TL2 that form the first and second fixing parts 50a, 50b are provided with pressing projections K for molding the first and second concave portions 51a, 51b, a cross-section of each pressing projection being formed into a substantially wedged shape. The pressing projections K are formed so that the first and second heat receiving portions H10, H20 are moved substantially right beside them while being thermally deformed.

Specifically, in the relay plate housing step, the relay plate 44 is housed in the accommodating concave portion 33g as shown by an arrow M5 in FIG. 8(a).

Next, in the relay plate fixing step, the heated thermal caulking jigs TL2 is caused to descend as shown by an arrow M6. Then, as shown by an arrow M7 in a dashed circle, the first and second heat receiving portions H10, H20 are thermally deformed by the pressing protrusions K, and are moved substantially right beside the relay plate toward the relay plate 44. Thereafter, the thermal caulking jigs TL2 are separated from the surface 33d of the main body portion 33c as shown by an arrow M8.

Consequently, the first and second heat receiving portions H10, H20 that have been heated and thermally deformed become the first and second fixing parts 50a, 50b, and cover the non-slidably contacting surfaces S in the slidably contacting surfaces 44a of the relay plate 44. Thus, the step of fixing the relay plate 44 into the accommodating concave portion 33g is completed.

Also in Embodiment 2 formed as described above, almost the same operation and effect as those in Embodiment 1 can be obtained. Additionally thereto, in Embodiment 2, most portions of the first and second heat receiving portions H10, H20 are thermally deformed by melting, and the thermally deformed portions are moved substantially right beside them. Consequently, the first and second fixing parts 50a, 50b can be further improved in strength than the first and second heat receiving portions H10, H20 of Embodiment 1 (see an inside of a dashed circle in FIG. 7) which are formed so as to be folded from their roots. Namely, Embodiment 1 is slightly lower (weaker) in coupling strength of tissue of a boundary line BL in the dashed circle of FIG. 7 than Embodiment 2.

Next, Embodiment 3 of the present invention will be described in detail with reference to the drawing. Incidentally, portions having almost the same functions as those in Embodiment 1 described above are denoted by the same reference numerals, and detailed description thereof will be omitted.

FIG. 10 is a diagram for explaining a procedure for molding a fixing part of Embodiment 3.

FIG. 10 shows only a first heat receiving portion H1 side, but the same applies also to a second heat receiving portion H2 side. As shown in FIG. 10, Embodiment 3 is different from Embodiment 1 in that the first heat receiving portion H1 is provided at a position away from a wall W for forming the accommodating concave portion 33g with respect to a radial direction of the worm wheel 33. Specifically, a position of the first heat receiving portion H1 is separated from the wall W by a distance L3 in the radial direction (right and left directions in figure) of the worm wheel 33. Here, the distance L3 is slightly shorter (approximately 2.5 mm) in length than a thickness dimension T4 of the relay plate 44 (L3<T4).

Incidentally, after processing (working) the first heat receiving portion H1 with the thermal caulking jig TL1 (after thermally deforming), the first heat receiving portion H1 becomes a first fixed part (fixed part) 60 as shown by a broken line in figure.

Also in Embodiment 3 formed as described above, also the same operation and effect as those in Embodiment 1 can be obtained. Additionally thereto, Embodiment 3 makes it possible to prevent excessive heat from being transmitted to the wall W of the accommodating concave portion 33g and to more reliably prevent distortion from occurring in the accommodating concave portion 33g. Consequently, the rattling of the relay plate 44 with respect to the accommodating concave portion 33g is suppressed, which makes it possible to prevent generation etc. of abnormal noise. Additionally, since the wall W can be reliably prevented from being thermally deformed, a melted resin does not enter the holes of the relay plate 44. Therefore, a contained amount of lubricating oil can be prevented from varying for each product while the lubricating oil prevents the relay plate 44 from being damaged.

Next, Embodiment 4 of the present invention will be described in detail with reference to the drawings. Incidentally, portions having almost the same functions as those in Embodiment 1 described above are denoted by the same reference numerals, and detailed description thereof will be omitted.

FIGS. 11(a), 11(b), and 11C illustrate diagrams for explaining a relay plate and a fixing part of Embodiment 4. Incidentally, FIG. 11(c) illustrates a sectional view taken along line B-B of FIG. 11(a).

As shown in FIG. 11, Embodiment 4 is different from Embodiment 1 in: a shape of a relay plate 70; shapes of first and second fixing parts 80a, 80b; shapes of first and second heat receiving portions H1a, H2a to be the fixing parts 80a, 80b; and shapes of thermal caulking jigs TL3 used for molding the first and second fixing parts 80a, 80b.

As shown in FIG. 11(a), a relay plate 70 is provided with a total of eight protrusions 71 on its front and back. These protrusions 71 protrude in the axial direction of the worm wheel 33, and are arranged at longitudinal central portions of the two sets of sides 44b, 44b and 44c, 44c. This eliminates an assembling directivity of the relay plate 70 into the accommodating concave portion 33g.

When the relay plate 70 is viewed from an axial direction of the output shaft 34, the protrusions 71 are formed into semicircular shapes and are arranged in the vicinity of the wall W of the accommodating concave portion 33g under a state of hosing the relay plate 70 in the accommodating concave portion 33g. Additionally, projection height L4 of each protrusion 71 is set to approximately half a thickness dimension T4 of the relay plate 70 (L4=T4/2).

Then, the protrusions 71 corresponding to the one set of sides 44c, 44c in the two sets of sides 44b, 44b and 44c, 44c are covered with the first and second fixed parts (fixed parts) 80a, 80b. Consequently, since the first and second fixing parts 80a, 80b respectively cover the protrusions 71, projection height of the first and second fixing parts 80a, 80b is larger (higher) than projection height of the first and second fixing parts 35a, 35b (see FIG. 7) of Embodiment 1. Along with this, a depth dimension of a pressing part P of the thermal caulking jig TL3 is also larger (deeper) than a depth dimension of the pressing part P (see FIG. 7) of the thermal caulking jig TL1 in Embodiment 1. Additionally, as the depth dimension of the pressing part P of the thermal caulking jig TL3 is increased, projection height of the first and second heat receiving portions H1a, H2a is also increased. Namely, this increases volumes of the first and second heat receiving portions H1a, H2a.

Then, in the relay plate fixing step, the heated thermal caulking jig TL3 is caused to descend. By doing so, the first and second heat receiving portions (heat receiving portions) H1a, H2a are melted and thermally deformed according to the shapes of the pressing parts P. Consequently, the protrusions 71 are covered with the first and second heat receiving portions H1a, H2a that have been heated and thermally deformed.

Also in Embodiment 4 formed as described above, almost the same operation and effect as those in Embodiment 1 can be obtained. Additionally thereto, in Embodiment 4, the first and second fixing parts 80a, 80b cover the protrusions 71 so as to respectively surround them, so that coupling strength (assembling rigidity) between them can be further increased.

Additionally, since the protrusions 71 are provided, another relay plate 70 is stuck on the relay plate 70 when the relay plate 70 is alone before being housed in the accommodating concave portion 33g, thereby being capable of preventing the relay plate 70 from being separated. Consequently, assemblability of the relay plate 70 can be improved while the relay plate 70 is prevented from being damaged, so that improvement of its yield is achieved.

Next, Embodiment 5 of the present invention will be described in detail with reference to the drawings. Incidentally, portions having almost the same functions as those in Embodiment 1 described above are denoted by the same reference numerals, and detailed description thereof will be omitted.

FIGS. 12(a) and 12(b) illustrate diagrams for explaining a relay plate and a fixing part of Embodiment 5.

As shown in FIG. 12, Embodiment 5 is different from Embodiment 1 in: a shape of a relay plate 90; shapes of first and second fixing parts 100a, 100b; shapes of first and second heat receiving portions H1b, H2b to be the fixing parts 100a, 100b; and a shape of thermal caulking jig TL4 used for molding the first and second fixing parts 100a, 100b.

As shown in FIG. 12(a), a total of four notch portions 91 are provided around a relay plate 90. These notch portions 91 are arranged at longitudinal central portions of the two sets of sides 44b, 44b and 44c, 44c. These notch portions 91 are formed into semicircular shapes when the relay plate 90 is viewed from the axial direction of the output shaft 34. This eliminates assembling directivity of the relay plate 90 with respect to the accommodating concave portion 33g.

The notch portions 91 corresponding to the one set of sides 44c, 44c in the two sets of sides 44b, 44b and 44c, 44c are covered with first and second fixing parts (fixing parts) 100a, 100b. Incidentally, the first and second fixing parts 100a, 100b are formed into circular shapes when the relay plate 90 is viewed from the axial direction of the output shaft 34.

These first and second fixing parts 100a, 100b are formed by a thermal caulking jig TL4 that has been formed into a substantially columnar shape. Specifically, a pressing part P concaved (recessed) so as to have a bowl shape is formed on (in) an abutting surface (tip portion) of the thermal caulking jig TL4. In contrast thereto, the worm wheel 33 is provided with first and second heat receiving portions (heat receiving portions) H1b, H2b that have columnar shapes.

Then, by pressing the pressing part P of the heated thermal caulking jig TL4 against the tip portions of the first and second heat receiving portions H1b, H2b, the circular fixing parts 100a, 100b as shown in FIG. 12(b) are formed.

Also in Embodiment 5 formed as described above, almost the same operation and effect as those in embodiment 1 can be obtained. Additionally thereto, Embodiment 5 can further increase a contacting portion between the relay plate 90 and each of the first and second fixing parts 100a, 100b by the notch portion 91 than that of Embodiment 1, so that it can further increase coupling strength (assembling rigidity) between the both.

Next, Embodiment 6 of the present invention will be described in detail with reference to the drawing. Incidentally, portions having almost the same functions as those in Embodiment 1 described above are denoted by the same reference numerals, and detailed description thereof will be omitted.

FIG. 13 illustrates a diagram for explaining a relay plate and a fixing part of Embodiment 6.

As shown in FIG. 13, Embodiment 6 adopts the relay plate 70 (see FIG. 11(a)) of Embodiment 4, and adopts a fixing structure (see FIG. 12(b)) of Embodiment 5. Specifically, the protrusions 71 corresponding to the one set of sides 44c, 44c in the two sets of sides 44b, 44b and 44c, 44c are covered with the first and second fixing parts 100a, 100b that have almost the same structures as those of FIG. 12(b).

Also in Embodiment 6 formed as described above, almost the same operation and effect as those in Embodiment 1 described above can be obtained. Additionally thereto, since the first and second fixing parts 100a, 100b cover the protrusions 71 so as to respectively wrap them, Embodiment 6 can further increase coupling strength (assembling rigidity) between the both.

Next, Embodiment 7 of the present invention will be described in detail with reference to the drawings. Incidentally, portions having almost the same functions as those in Embodiment 1 described above are denoted by the same reference numerals, and detailed description thereof will be omitted.

FIGS. 14(a) and 14(b) illustrate views corresponding to FIG. 12 and showing Embodiment 7.

Figure 14:
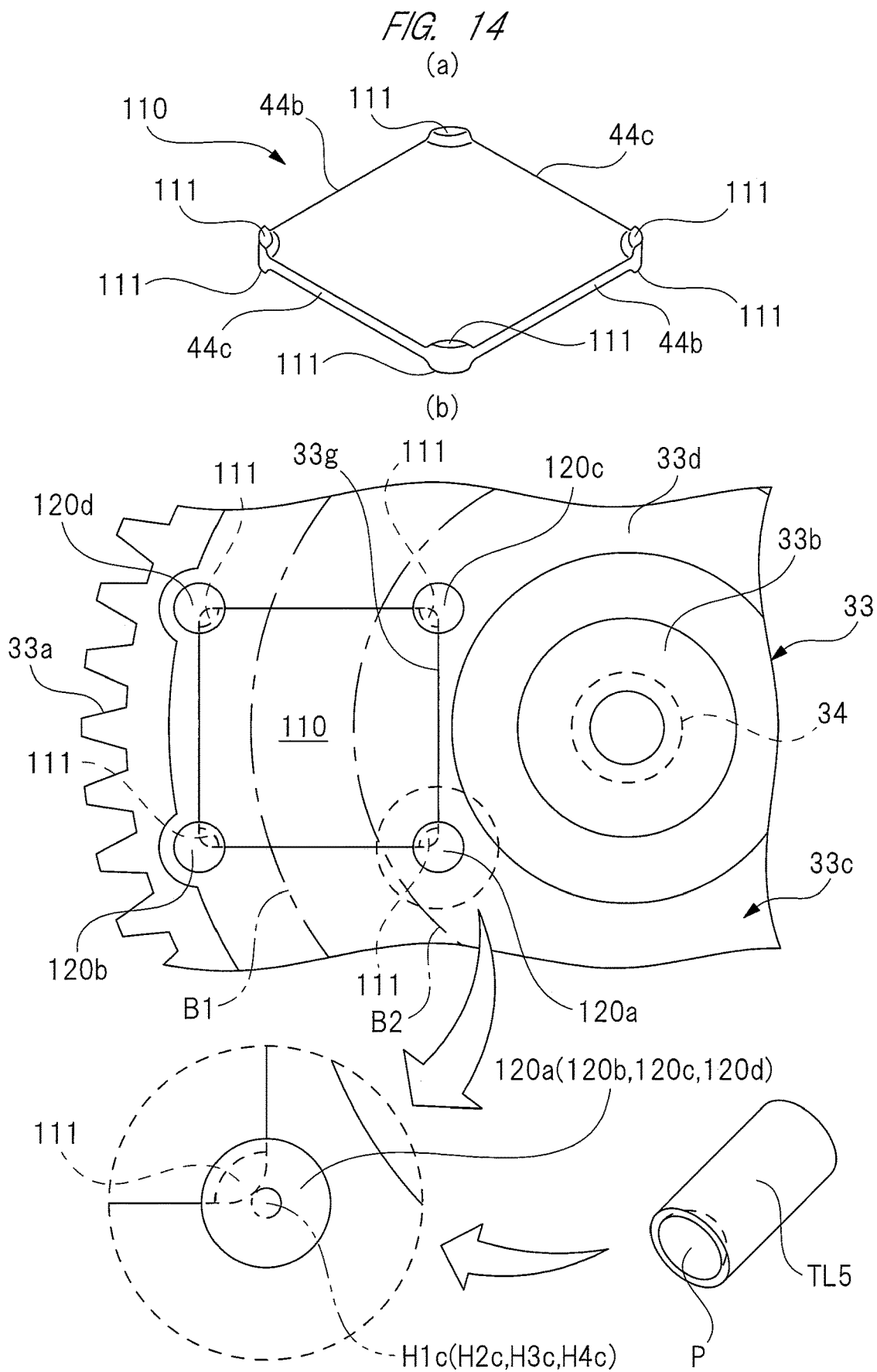

As shown in FIG. 14, Embodiment 7 is different from Embodiment 1 in: a shape of a relay plate 110; positions provided with first to fourth fixing parts 120a to 120d; shapes of first to fourth heat receiving portions H1c to H4c to be the first to fourth fixing parts 120a to 120d; and a shape of a thermal caulking jig TL5 used for molding the first to fourth fixing parts 120a to 120d.

As shown in FIG. 14, when the worm wheel 33 is viewed from the axial direction, a relay plate 110 is formed into a substantially square shape. A total of eight protrusions 111 are provided around the relay plate 110 on its front and back. These protrusions 111 project in the axial direction of the worm wheel 33 and are respectively arranged at corners formed by the two sets of sides 44b, 44b and 44c, 44c. This layout eliminates assembling directivity of the relay plate 110 with respect to the accommodating concave portion 33g.

Then, the protrusions 111 provided at positions corresponding to the four corners are covered with first to fourth fixing parts (fixing parts) 120a to 120d. Incidentally, the first to fourth fixing parts 120a to 120d are formed into circular shapes when the relay plate 110 is viewed from the axial direction of the output shaft 34.

These first to fourth fixing parts 120a to 120d are formed by a thermal caulking jig TL5 that has been formed into a substantially cylindrical (columnar) shape. Specifically, a pressing part P concaved so as to have a bowl shape is formed on an abutting surface (tip portion) of the thermal caulking jig TL5. However, a diameter of the thermal caulking jig TL5 is smaller than that of the thermal caulking jig TL4 of Embodiment 5 (see FIG. 12).

In contrast thereto, the worm wheel 33 is provided with first to fourth heat receiving portions (heat receiving portions) H1c to H4c each having a cylindrical shape. However, the first to fourth heat receiving portions H1c to H4c have smaller diameters and longer axial lengths than those of the first and second heat receiving portions H1b, H2b (see FIG. 12) of Embodiment 5.

Then, by pressing the pressing part P of the heated thermal caulking jig TL5 against tip portions of the first to fourth heat receiving portions H1c to H4c, the first to fourth fixing parts 120a to 120d having circular shapes as shown in FIG. 14(b) are formed.

Also in Embodiment 7 formed as described above, almost the same operation and effect as those of Embodiment 4 (see FIG. 11) can be obtained.

Next, Embodiment 8 of the present invention will be described in detail with reference to the drawings. Incidentally, portions having almost the same functions as those in Embodiment 1 described above are denoted by the same reference numerals, and detailed description thereof will be omitted.

FIGS. 15(a) and 15(b) illustrate views corresponding to FIG. 12 and showing Embodiment 8.

As shown in FIG. 15, Embodiment 8 is different from Embodiment 7 in a shape of a relay plate 130.

As shown in FIG. 15, when the worm wheel 33 is viewed from the axial direction, a relay plate 130 is formed into a substantially square shape. Additionally, a total of four notch portions 131 are provided around the relay plate 130. Specifically, these notch portions 131 are respectively arranged at corners formed by the two sets of sides 44b, 44b and 44c, 44c. This layout eliminates assembling directivity of the relay plate 130 with respect to the accommodating concave portion 33g.

Then, the notch portions 131 provided at positions corresponding to the four corners are covered with the first to fourth fixing parts 120a to 120d.

Also in Embodiment 8 formed as described above, almost the same operation and effect as those in Embodiment 5 (see FIG. 12) can be obtained.

Next, Embodiment 9 of the present invention will be described in detail with reference to the drawings. Incidentally portions having almost the same functions as those in Embodiment 1 described above are denoted by the same reference numerals, and detailed description thereof will be omitted.

FIGS. 16(a) and 16(b) illustrate diagrams for explaining a relay plate and a fixing part of Embodiment 9.

As shown in FIG. 16, Embodiment 9 adopts a relay 140 that has a structure of combining the relay plate 90 (see FIG. 12) of Embodiment 5 and the relay plate 130 (see FIG. 15) of Embodiment 8. Specifically, as shown in FIG. 16, when the worm wheel 33 is viewed from the axial direction, the relay plate 140 is formed into a substantially square shape. Additionally, a large-diameter notch portion 91 is disposed at each longitudinal central portion of the two sets of sides 44b, 44b and 44c, 44c. Further, a small-diameter notch portion 131 is disposed at each corner formed by the two sets of sides 44b, 44b and 44c, 44c.

Then, as shown in FIG. 16(b), an output shaft 34 side of the relay plate 140 is fixed by a fixing structure (see FIG. 12) of Embodiment 5, and a tooth portion 33a side of the relay plate 140 is fixed by a fixing structure (see FIG. 15) of Embodiment 8.

Also in Embodiment 9 formed as described above, almost the same operations and effects as those of Embodiment 5 (see FIG. 12) and Embodiment 8 (see FIG. 15) can be obtained.

Next, Embodiment 10 of the present invention will be described in detail with reference to the drawing. Incidentally, portions having almost the same functions as those in Embodiment 1 described above are denoted by the same reference numerals, and detailed description thereof will be omitted.

FIG. 17 illustrates a view corresponding to FIG. 13 and showing Embodiment 10.

As shown in FIG. 17, Embodiment 10 firstly adopts the relay plate 70 (see FIG. 11) of Embodiment 4. Then, an output shaft 34 side of the relay plate 70 is fixed by a fixing structure (see FIG. 13) of Embodiment 6, and a tooth portion 33a side of the relay plate 70 is fixed by a fixing structure (see FIG. 11) of Embodiment 4.

Also in Embodiment 10 formed as described above, almost the same operations and effects as those of Embodiment 4 (see FIG. 11) and Embodiment 6 (see FIG. 13) can be obtained.

Next, Embodiment 11 of the present invention will be described in detail with reference to the drawing. Incidentally, portions having almost the same functions as those in Embodiment 1 described above are denoted by the same reference numerals, and detailed description thereof will be omitted.

FIG. 18 illustrates a view showing a relay plate of Embodiment 11.

As shown in FIG. 18, Embodiment 11 are different from Embodiment 1 in adopting a circular relay plate 150 with a vertically and horizontally symmetrical shape when the worm wheel 33 (see FIG. 4) is viewed from the axial direction. According thereto, shapes of first and second fixing parts (fixing parts) 151a, 151b (areas surrounded by broken lines in figure) are set to have substantially circular arc shapes when the worm wheel 33 is viewed from the axial direction.

Also in Embodiment 11 formed as described above, almost the same operation and effect as those in Embodiment 1 described above can be obtained.

Next, Embodiment 12 of the present invention will be described in detail with reference to the drawing. Incidentally, portions having almost the same functions as those in Embodiment 1 described above are denoted by the same reference numerals, and detailed description thereof will be omitted.

FIG. 19 illustrates a view showing a relay plate of Embodiment 12.

As shown in FIG. 19, Embodiment 12 is different from Embodiment 1 in that: a through hole 160 is provided at a central portion of a relay plate 44; and a fixing part 161 (area surrounded by a broken line in figure) is disposed so as to surround a location of the through hole 160.

Also in Embodiment 12 formed as described above, almost the same operation and effect as those in Embodiment 1 can be obtained. Additionally thereto, Embodiment 12 has only to provide one fixing part 161, which makes it possible to achieve reduction of the number of assembling steps. Incidentally, since the fixing part 161 is disposed at the central portion of the relay plate 44, the relay plate 44 can be fixed to the worm wheel 33 (see FIGS. 4 and 5) with good (proper) balance even if being disposed only at one place.

Next, Embodiment 13 of the present invention will be described in detail with reference to the drawing. Incidentally, portions having almost the same functions as those in Embodiment 1 described above are denoted by the same reference numerals, and detailed description thereof will be omitted.

FIG. 20 illustrates a view showing a relay plate of Embodiment 13.

As shown in FIG. 20, Embodiment 13 different from Embodiment 1 in that fine grooves 170 are provided on front and back surfaces of the relay plate 44. Then, adopted for fixing the relay plate 44 can be a fixing structure (rectangular shape) of Embodiment 1 or a fixing structure (circular shape) of Embodiment 5.

Also in Embodiment 13 formed as described above, almost the same function and effect as those in Embodiment 1 can be obtained. Additionally thereto, Embodiment 13 can impregnate more lubricating oil. This makes it possible to further improve sliding properties while ensuring conductivity properties. Further, since a thermally deformed (melted) resin can be easily attached securely thereto in forming the fixing part, fixing strength of the relay plate 44 to the worm wheel 33 (see FIG. 4) can be further improved.

Further, when abrasion powder of the relay plate 44 is generated due to friction on the contact plates 43a, 43b (see FIG. 3(b)), the abrasion powder can be caused to enter the grooves 170. This makes it possible to always ensure good conductivity properties, suppress adhesion of the abrasion powder onto portions other than the relay plate 44, and furthermore prevent unintended energization (short circuit) of the contact plates 43a, 43b.

Next, Embodiment 14 of the present invention will be described in detail with reference to the drawing. Incidentally, portions having almost the same functions as those in Embodiment 1 described above are denoted by the same reference numerals, and detailed description thereof will be omitted.

FIG. 21 illustrates a view corresponding to FIG. 9 and showing Embodiment 14.

As shown in FIG. 21, Embodiment 14 is different from Embodiment 1 in a fixing structure of the relay plate 44 to the worm wheel 33. Specifically, Embodiment 1 thermally deforms (melts), as shown in FIG. 4, a part of the worm wheel 33 to form the first and second fixing parts 35a, 35b, while Embodiment 14 provides first and second hook claws 180a, 180b instead of the first and second fixing parts 35a, 35b. Then, the relay plate 44 is hooked on the first and second hooking claws 180a, 180b. Thus, Embodiment 14 adopts a so-called "snap-fit" fixing structure. Incidentally, the first and second hooking claws 180a, 180b of Embodiment 14 constitute fixing parts in the present invention.

Also in Embodiment 14 formed as described above, almost the same operation and effect as those in Embodiment 1 can be obtained. Additionally thereto, Embodiment 14 makes thermal caulking work (operation) by the thermal caulking jig unnecessary, thereby making it possible to greatly improve assemblability of the relay plate 44 to the worm wheel 33.

Next, Embodiment 15 of the present invention will be described in detail with reference to the drawing. Incidentally, portions having almost the same functions as those in Embodiment 1 described above are denoted by the same reference numerals, and detailed description thereof will be omitted.

FIG. 22 illustrates a view corresponding to FIG. 6 and showing Embodiment 15.

As shown in FIG. 22, Embodiment 15 is different from Embodiment 1 only in a fixing structure of the relay plate 44 to the worm wheel 33. Specifically, Embodiment 1 thermally deforms (melts) a part of the worm wheel 33 to form the first and second fixing parts 35a, 35b as shown in FIG. 4, while Embodiment 15 provides first and second rivets 190a, 190b that are made of metal and are separate from the worm wheel 33 instead of the first and second fixing parts 35a, 35b. Then, the relay plate 44 is fixed to the worm wheel 33 by the first and second rivets 190a, 190b. Incidentally, the first and second rivets 190a, 190b of Embodiment 15 constitute fixing parts in the present invention.

Also in Embodiment 15 formed as described above, almost the same operation and effect as those in Embodiment 1 can be obtained. Additionally thereto, Embodiment 15 performs caulking work for deforming the rivets instead of thermal caulking work, thereby making it possible to reliably prevent the worm wheel 33 from being thermally deformed due to heating.

Next, Embodiment 16 of the present invention will be described in detail with reference to the drawings. Incidentally, portions having almost the same functions as those in Embodiment 1 described above are denoted by the same reference numerals, and detailed description thereof will be omitted.

FIGS. 23(a), 23(b) and 23(c) illustrate diagrams for explaining a relay plate and a fixing part of Embodiment 16; FIG. 24 illustrates a perspective view showing an accommodating concave portion of Embodiment 16; FIG. 25 illustrates a sectional view taken along line D-D of FIG. 23(c); and FIG. 26 illustrates a sectional view taken along line E-E of FIG. 23(c). Incidentally, FIG. 23(b) is an enlarged view that enlarges a part of the relay plate and is viewed from an arrow C in FIG. 23(a).

As shown in FIGS. 23 to 26, Embodiment 16 is different from Embodiment 1 in a shape of a relay plate 200 and a shape of an accommodating concave portion 210.

As shown in FIG. 23, a relay plate 200 is formed into a substantially square shape when the worm wheel 33 is viewed from the axial direction. A first inclined surface 203 is provided on each of a front surface 201 and a back surface 202 (front and back) of the relay plate 200 so as to surround a circumference of the relay plate 200. These first inclined surfaces 203 are formed so as to make the relay plate 200 gradually thinned toward the circumference of the relay plate 200, thereby making an outer circumference portion of the relay plate 200 thinner in thickness than a main body portion of the relay plate 200.

Incidentally, an inclination angle $\alpha°$ of the first inclined surface 203 is set to about 10° in the present embodiment. However, the inclination angle $\alpha°$ is set so that the first inclined surface has a gentle taper shape of about 5° to 30°. Additionally, as shown in FIGS. 23(c) and 25, at least parts of the first inclined surface 203 are covered with the first fixing part 35a and second fixing part 35b. Each width dimension t of the first inclined surfaces 203 with respect to its inclination direction is set to such a narrow width dimension that the first inclined surfaces are covered with the first fixing part 35a and second fixing part 35b.

Further, as shown in FIGS. 24 to 26, a pair of second inclined surfaces 211 and a pair of linear convex portions 212 are provided in the accommodating concave portion 210 of the worm wheel 33. More specifically, the pair of second inclined surfaces 211 are inclined so as to gradually climb (rise) from a bottom surface 210a of the accommodating concave portion 210 toward the wall W, and are arranged so as to oppose each other in each slidably contacting direction of the contact plates 43a, 43b (see FIG. 3(b)), i.e., in a direction indicated by an arrow DR given by a dash-single-dot line of FIG. 24.

Then, the first inclined surfaces 203 of the relay plate 200 respectively contact with these second inclined surfaces 211 in a substantially surface-contact state while the relay plate 200 is housed in an accommodating concave portion 210. Namely, the pair of second inclined surfaces 211 supports the first inclined surfaces 203 of the relay plate 200. Consequently, an inclination angle of the second inclined surface 211 is also set to about 10° similarly to that of the first inclined surface 203. Here, the setting of the inclination angle of the second inclined surface 211 is made so as to be equivalent to the inclination angle of the first inclined surface 203 according to the inclination angle of the first inclined surface.

Additionally, the pair of linear convex portion 212 protrude from the bottom surface 210a in the axial direction of the worm wheel 33 at minute height (about 0.3 mm), and extend in the radial direction of the worm wheel 33, respectively. Further, the pair of linear convex portions 212 are provided apart from each other so as to be at a predetermined interval in a slidably contacting direction (direction indicated by an arrow DR illustrated by a dash-single-dot line in FIG. 24) of the contact plates 43a, 43b. Furthermore, the pair of linear convex portions 212 are formed so at to have substantially circular-arc-shaped cross-sections as shown in FIG. 26, and are provided so as to extend between the first heat receiving portion H1 and second heat receiving portion H2 as shown in FIG. 24.

Then, the linear convex portions 212 have a function of preventing the relay plate 200 from being excessively inclined with respect to the accommodating concave portion 210 when the relay plate 200 is housed in the accommodating concave portion 210. Namely, the pair of linear convex portions 212 causes the relay plate 200 housed in the accommodating concave portion 210 to be made parallel to the bottom surface 210a. More specifically, as shown by a dash-double-dot line in FIG. 26, when the relay plate 200 is inclined with respect to the accommodating concave portion 210, the pair of linear convex portions 212 each support a back surface 202 of the relay plate 200.

Consequently, the relay plate 200 becomes parallel to the bottom surface 210a and is accurately housed in the accommodating concave portion 210. Here, the pair of linear convex portions 212 constitute convex portions in the present invention. Incidentally, while the relay plate 200 is parallel to the bottom surface 210a (a state in which the relay plate 200 is correctly accommodated), the pair of linear convex portions 212 and the back surface 202 of the relay plate 200 become a non-slidably contacting state, which brings a minute gap d being formed between the both. Thus, the pair of linear convex portions 212 does not hinder the first inclined surface 203 and the second inclined surface 211 from making surface-contact with each other.

Also in Embodiment 16 formed as described above, almost the same operation and effect as those in Embodiment 1 can be obtained. Additionally thereto, Embodiment 16 support the first inclined surfaces 203 of the relay plate 200 by the second inclined surfaces 211 of the accommodating concave portion 210 in the substantially surface-contact state, so that the rattling of the relay plate 200 inside the accommodating concave portion 210 is suppressed.

Particularly, in Embodiment 16, the pair of second inclined surfaces 211 are arranged so as to oppose each other in the slidably contacting direction (direction indicated by the arrow DR illustrated by the dash-single-dot line in FIG. 24) of the contact plates 43a, 43b, so that even if the relay plate 200 is elastically deformed (minute amount) due to pressing force of the contact plates 43a, 43b, the rattling of the relay plate 200 in the accommodating concave portion 210 can be effectively suppressed.

At this time, even when the relay plate 200 is bent (flexed) due to the pressing force of the contact plates 43a, 43b, the relay plate 200 is supported by the pair of linear convex portions 212 that is provided on the bottom surface 210a of the accommodating concave portion 210, so that occurrence of further flexure of the relay plate 200 beyond the above-mentioned flexure is effectively suppressed. Thus, damage due to the elastic deformation of the relay plate 200 is suppressed, which makes it possible to achieve a long lifetime of the relay plate 200.

Incidentally, since the first inclined surfaces 203 are only provided on front and back sides thereof, the shape of the relay plate 200 can do with a simple shape and the relay plate 200 can be easily formed of sintered metal and also improve its durability.

Next, Embodiment 17 of the present invention will be described in detail with reference to the drawings. Incidentally, portions having functions similar to those of Embodiment 16 described above are denoted by the same reference numerals, and detailed description thereof will be omitted.

FIGS. 27(a) and 27(b) illustrate diagrams for explaining a relay plate of Embodiment 17, and FIG. 28 illustrates a diagram for explaining a manufacturing procedure for the relay plate of FIG. 27. Incidentally, FIG. 27(b) is an enlarged view as viewed from a direction indicated by an arrow F in FIG. 27(a) and which enlarges a part of the relay plate.

As shown in FIGS. 27 and 28, Embodiment 17 is different from Embodiment 26 (see FIG. 23) only in a shape of a relay plate 300.

As shown in FIG. 27, a relay plate 300 is formed in a substantially square shape when the worm wheel 33 is viewed from the axial direction. First inclined surfaces 203 are provided respectively on a front surface 201 and a back surface 202 (front and back) of the relay plate 300 so as to surround a circumference of the relay plate 300, and flat surfaces 301 are further provided respectively around the front surface 201 and back surface 202 of the relay plate 300 so as to surround circumferences of the first inclined surfaces 203. These flat surfaces 301 extend in directions in which the front surface 201 and back surface 202 extend, and are not inclined like the first inclined surfaces 203. Additionally, a width dimension T of the flat surface 301 is smaller than a width dimension t of the first inclined surface 203 (T<t).

This makes it possible to achieve, about the relay plate 300 of Embodiment 17 as shown in FIG. 28, a long lifetime of each of upper and lower dies 330, 340 for molding the relay plate 300. Specifically, the relay plate 300 is formed by a molding device 310 having three molding dies. The molding device 310 includes a fixed die 320 for molding the circumference of the relay plate 300, and upper and lower dies 330, 340 which are movable to the fixed die 320 vertically (in an up-down direction) in figure.

Then, the upper and lower dies 330, 340 are provided with flat pressing parts 331, 341 for forming the flat surfaces 301 around the relay plate 300. Consequently, there is no pointed (sharp) portion on opposing surfaces (pressing surfaces) of the upper and lower dies 330 and 340, and durability against repeated pressing operations F can be improved.

Incidentally, each width dimension T of the flat pressing parts 331, 341 of the upper and lower dies 330, 340 is the same as a width dimension T of the flat surface 301 as a matter of course. Here, in Embodiment 16 not having the flat surface 301, the upper and lower dies (not shown) for molding the relay plate 200 (see FIG. 23) do not have flat pressing parts, respectively, which leads to bring existence of a pointed part at a location corresponding to the flat pressing part of each of the upper and lower dies.

Above in Embodiment 17 formed as described above, almost the same operation and effect as those in Embodiment 16 can be obtained. Additionally thereto, Embodiment 17 makes it possible to improve the durability of the upper and lower dies 330, 340 for molding the relay plate 300 and, furthermore, to reduce manufacturing costs.

Next, Embodiment 18 of the present invention will be described in detail with reference to the drawings. Incidentally, portions having functions similar to those of Embodiment 16 described above are denoted by the same reference numerals, and detailed description thereof will be omitted.

FIG. 29 illustrates a perspective view showing an accommodating concave portion of Embodiment 18, and FIG. 30 illustrates a sectional view (including a relay plate) taken along line F-F of FIG. 29.

As shown in FIGS. 29 and 30, Embodiment 18 are different from Embodiment 16 only in a shape of an accommodating concave portion 400.

As shown in FIG. 29, an accommodating concave portion 400 of the worm wheel 33 is provided with other pair of second inclined surfaces 401 additionally to the pair of second inclined surfaces 211, and is further provided with a total of three linear convex portions 212. Namely, Embodiment 18 adds the other pair of second inclined surfaces 401 and the one linear convex portion 212 in comparison with Embodiment 16.

More specifically, each of the other pair of second inclined surfaces 401 added is inclined so as to gradually rise (climb) from a bottom surface 210a of the accommodating concave portion 400 toward the wall W, and the other pair of second inclined surfaces 401 are arranged so as to oppose each other in the radial direction of the worm wheel 33. Namely, an opposing direction of the other pair of second inclined surfaces 401 and an opposing direction of the pair of second inclined surfaces 211 are orthogonal to each other.

Then, while the relay plate 200 is housed in the accommodating concave portion 400 (see FIG. 30), the first inclined surfaces 203 of the relay plate 200 are contacted also with the other pair of second inclined surfaces 401 in a substantially surface-contact state(s). Namely, the other pair of second inclined surfaces 401 supports the first inclined surfaces 203 of the relay plate 200. Consequently, an inclination angle of the other second inclined surface 401 is also set to about 10° similarly to those of the first inclined surface 203 and second inclined surface 211.

Additionally, the added one linear convex portion 212 is disposed between the pair of linear convex portions 212, and these three linear convex portions 212 are provided so as to be evenly spaced alongside in the slidably contacting direction of the contact plats 43a, 43b (see FIG. 3). More specifically, the added, middle linear convex portion 212 is disposed (placed) between positions corresponding to the longitudinal central portions of the first heat receiving portion H1 and second heat receiving portion H2, as shown in FIG. 29.

Also in Embodiment 18 formed as described above, almost the same operation and effect as those in Embodiment 16 can be obtained. Additionally thereto, Embodiment 18 supports the first inclined surfaces 203 of the relay plate 200 respectively by the pair of second inclined surfaces 211 and the other pair of second inclined surfaces 401 in the accommodating concave portion 400 in substantially surface-contact states therewith, thereby making it possible to more effectively suppress the rattling of the relay plate 200 with respect to the accommodating concave portion 400.

Particularly, Embodiment 18 arranges the other pair of second inclined surfaces 401 so as to oppose (face) each other in the radial direction of the worm wheel 33, thereby making it possible to prevent the relay plate 200 from being inclined with respect to the accommodating concave portion 400 with high accuracy and to firmly fix the relay plate into the accommodating concave portion by applying the pressing force f in a well-balanced manner in heat-caulking the heat receiving portions H1, H2 as shown in FIG. 30.

Further, even if the relay plate 200 is elastically deformed (minute amount) by the pressing force f at the time of the heat-caulking, the linear convex portion 212 is additionally provided between the locations corresponding to the longitudinal central portions of the first and second heat receiving portions H1, H2. Therefore, the relay plate 200 is suppressed (prevented) from being largely elastically deformed as indicated by a broken-line arrow M, which makes it possible to prevent damage to the relay plate 200 due to the pressing force f.

Next, Embodiment 19 of the present invention will be described in detail with reference to the drawing. Incidentally, portions having functions similar to those of Embodiment 16 described above are denoted by the same reference numerals, and detailed description thereof will be omitted.

FIG. 31 illustrates a sectional view for explaining Embodiment 19 and corresponding to FIG. 26.

As shown in FIG. 31, Embodiment 19 is different from Embodiment 16 (see FIG. 26) only in a shape of an accommodating concave portion 500.

More specifically, as shown in FIG. 31, a depth dimension H1 of an accommodating concave portion 500 is slightly smaller than that in Embodiment 16.

Consequently, the relay plate 200 becomes a state of slightly protruding from the accommodating concave portion 500 as shown in FIG. 31. More specifically, the relay plate 200 is housed in the accommodating concave portion 500 in the following height relationship.

As compared with Embodiment 16, a height dimension H2 from the bottom surface 210a of the accommodating concave portion 500 to the circumference of the relay plate 200 has a dimension ((H1≈H2) that is almost equal to a height dimension H1 from the bottom surface 210a of the accommodating concave portion 500 to the surface 33d of the worm wheel 33. Additionally, a height dimension H3 from the bottom surface 210a of the accommodating concave portion 500 to the surface 201 of the relay plate 200 is larger than the height dimension H1 from the bottom surface 210a of the accommodating concave portion 500 to the surface 33d of the worm wheel 33 (H3>H1).

Also in Embodiment 19 formed as described above, almost the same operation and effect as those in Embodiment 16 can be obtained. Additionally thereto, Embodiment 19 sets the height dimension H1 and the height dimension H2 so as to be almost equal to each other as described above, namely, sets a step between the surface 33d of the worm wheel 33 and the first inclined surface 203 so as for the step to be small, thereby making it possible to reduce noise generated when the contact plates 43a, 43b (see FIG. 3(b)) run (ride) on the relay plate 200. Therefore, even when the first inclined surfaces 203 are provided, silence properties thereof can be improved.

Additionally, since the height dimension H3 is made larger than the height dimension H1 as described above, the pressing force of the contact plates 43a, 43b against the relay plate 200 can be made larger than that in Embodiment 16. Consequently, the contact plates 43a, 43b can be more reliably energized.

Further, when the height dimension H3 is larger than the height dimension H1 as described above and when each energized state of the contact plates 43a, 43b is sufficient (enough), the pressing force against each surface 33d of the contact plates 43a, 43b is can be reduced (weakened). Consequently, wear of the worm wheel 33 made of a plastic material is suppressed. This makes it possible to maintain (keep) good energized states and silence properties of the contact plates 43a, 43b for a long period of time.

The present invention is not limited to the above embodiments, and it goes without saying that various changes can be made within a range of not departing from the spirit of the present invention. For example, in each of the above embodiments, the wiper motor 15 is shown as a wiper motor used for a drive source of the wiper device 14 whose wiping pattern is of a tandem type. However, the present invention is not limited to this. It may also be used for a drive source of a wiper device whose wiping pattern is an opposite wiping type patten or another wiping patten.

Additionally, in each of the above embodiments, the wiper motor 15 is shown as a wiper motor which is applied to the wiper device 14 provided on the front side of the vehicle 10. However, the present invention is not limited to this, and the present invention can be applied also to a wiper device which is provided on the back side of the vehicle 10, a rail vehicle, an aircraft or the like.

Further, in each of the above-described embodiments, each of the heat receiving portions is shown as a heat receiving portion that has been thermally deformed by each of the thermal caulking jigs TL1 to TL5. However, the present invention is not limited to this. Instead of the thermal caulking jigs TL1 to TL5, each heat receiving portion may be also heated and deformed by friction heat due to use of an ultrasonic welding machine.

Besides, materials, shapes, sizes (dimensions), numbers, and setting locations of respective components in each of the above embodiments are arbitrary as long as the present invention can be achieved, and they are not limited to each of the above embodiments.

The wiper motor drives the wiper members that form the wiper device provided in the vehicle such as an automobile, and it are used to wipe the windshield etc.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A wiper motor comprising:
a motor having an armature shaft;
a rotating body rotated by the armature shaft;
a relay plate provided on the rotating body;
at least two contact plates slidably contacting with a slidably contacting surface of the relay plate; and
rotation of the armature shaft being stopped when the contact plates are short-circuited by contacting with the slidably contacting surface,
wherein the relay plate has a vertically and horizontally symmetrical shape when the rotating body is viewed from its axial direction,
the rotating body is provided with an accommodating concave portion that houses the relay plate so as to be recessed in its axial direction, and
a part of a non-slidably contacting surface in the slidably contacting surface is covered with a plurality of fixing parts that are provided around the accommodating concave portion and that protrude in a direction intersecting with an axial direction of the rotating body, the non-slidably contacting surface being a surface with which the contact plates are not slidably contacted.

2. The wiper motor according to claim 1,
wherein a pair of fixing parts in the plurality of fixing parts are provided on a virtual line that passes an axial center of the rotating body and extends in a radial direction of the rotating body,
one of the pair of fixing parts protrudes radially outside the rotating body, and
the other of the pair of fixing parts protrudes radially inside the rotating body.

3. The wiper motor according to claim 1,
wherein the relay plate is formed into a substantially square shape when the rotating body is viewed from the axial direction, and
two sides of the relay plate, which oppose each other, are arranged on a virtual line that passes an axial center of the rotating body and extends in a radial direction of the rotating body.

4. The wiper motor according to claim 3,
wherein each of the fixing parts is formed into a substantially rectangular shape when the rotating body is viewed from the axial direction, and
the fixing parts extend along each of the two sides, and are longer in length than half a length of each of the sides.

5. The wiper motor according to claim 1,
wherein the relay plate is provided with a protrusion that protrudes in the axial direction of the rotating body, and
the protrusion is covered with the fixing parts.

6. The wiper motor according to claim 1,
Wherein a plurality of notch portions are provided around the relay plate, and
the notch portions are covered with the fixing parts.

7. The wiper motor according to claim 1,
wherein first inclined surfaces are provided on front and back surfaces of the relay plate, the first inclined surfaces being directed toward a circumference of the relay plate and thinned gradually toward the relay plate,
at least parts of the first inclined surfaces are covered with the fixing parts, and
second inclined surfaces that support the first inclined surfaces are provided in the accommodating concave portion.

8. The wiper motor according to claim 7,
wherein a pair of second inclined surfaces in the second inclined surfaces are arranged so as to oppose each other in a slidably contacting direction of the contact plate.

9. The wiper motor according to claim 7,
wherein the pair of second inclined surfaces are arranged so as to oppose each other in the radial direction of the rotating body.

10. The wiper motor according to claim 7,
wherein a plurality of convex portions are provided on a bottom surface of the accommodating concave portion so that the relay plate housed in the accommodating concave portion is made parallel to the bottom surface.

11. A method of manufacturing a wiper motor, the wiper motor including:
a motor having an armature shaft;
a rotating body rotated by the armature shaft;
a relay plate provided on the rotating body;
at least two contact plates slidably contacting with a slidably contacting surface of the relay plate; and
rotation of the armature shaft being stopped when the contact plates are short-circuited by contacting with the slidably contacting surface,
the method comprising:
a relay plate housing step of housing the relay plate in an accommodating concave portion that is provided in the rotating body; and
a relay plate fixing step of heating and thermally deforming a heat receiving portion and covering a part of a non-slidably contacting surface in the slidably contacting surface with the thermally deformed heat receiving portion, the heat receiving portion being provided around the accommodating concave portion and protruding in an axial direction of the rotating body, the non-slidably contacting surface being a surface with which the contact plates are not slidably contacted.

12. The method for manufacturing a wiper motor according to claim 11,
wherein the heat receiving portion is provided in a radial direction of the rotating body and at a position apart from a wall that forms the accommodating concave portion.

13. The method of manufacturing a wiper motor according to claim 11,
wherein the relay plate is provided with a protrusion that protrudes in an axial direction of the rotating body, and
the protrusion is covered with the thermally deformed heat receiving portion in the relay plate fixing step.

* * * * *